United States Patent
Lee et al.

(10) Patent No.: US 10,033,878 B2
(45) Date of Patent: Jul. 24, 2018

(54) METHOD AND SYSTEM FOR PROVIDING SPONSORED SERVICE ON IMS-BASED MOBILE COMMUNICATION NETWORK

(71) Applicants: Samsung Electronics Co., Ltd., Gyeonggi-do (KR); Kyung Hee University Industry Academic, Gyeonggi-do (KR)

(72) Inventors: Ji Cheol Lee, Gyeonggi-do (KR); Sung Won Lee, Gyeonggi-do (KR); Beom Sik Bae, Gyeonggi-do (KR); Han Na Lim, Seoul (KR); Sang Soo Jeong, Gyeonggi-do (KR); Song Yeon Cho, Seoul (KR); Sung Ho Choi, Gyeonggi-do (KR)

(73) Assignees: Samsung Electronics Co., Ltd., Suwon-si (KR); Kyung Hee University Industry Academic, Yongin-si (KR)

( * ) Notice: Subject to any disclaimer, the term of this patent is extended or adjusted under 35 U.S.C. 154(b) by 761 days.

(21) Appl. No.: 14/363,772

(22) PCT Filed: Dec. 6, 2012

(86) PCT No.: PCT/KR2012/010566
§ 371 (c)(1),
(2) Date: Jun. 6, 2014

(87) PCT Pub. No.: WO2013/085314
PCT Pub. Date: Jun. 13, 2013

(65) Prior Publication Data
US 2014/0348029 A1    Nov. 27, 2014

(30) Foreign Application Priority Data
Dec. 6, 2011   (KR) .................. 10-2011-0129931

(51) Int. Cl.
*H04M 11/00* (2006.01)
*H04M 15/00* (2006.01)
(Continued)

(52) U.S. Cl.
CPC ........ *H04M 15/57* (2013.01); *H04L 12/1453* (2013.01); *H04L 12/1475* (2013.01);
(Continued)

(58) Field of Classification Search
CPC ... H04W 4/24; H04W 8/245; H04M 2215/32; H04M 15/57; G06F 21/10; H04L 12/1453
(Continued)

(56) References Cited

U.S. PATENT DOCUMENTS 6,125,108 A * 9/2000 Shaffer ............. H04L 29/12103
370/259
8,306,518 B1 * 11/2012 Gailloux ............. H04L 41/0813
379/201.12
(Continued)

FOREIGN PATENT DOCUMENTS

JP    2006-500879         1/2006
KR    10-2007-0005117 A   1/2007
(Continued)

OTHER PUBLICATIONS

International Search Report dated Feb. 28, 2013 in connection with International Patent Application No. PCT/KR2012/010566, 5 pages.
(Continued)

*Primary Examiner* — Danh Le

(57) ABSTRACT

The present invention relates to a method and a system for providing a sponsored service on an IMS-based mobile communication network, and comprises the steps of: a sponsored service client transmitting to a sponsored service server a sponsored service start request message; the sponsored service server determining the validity of the spon-
(Continued)

sored service after receiving the start request message; transmitting to the sponsored service client a sponsored service start acceptance message when the sponsored service server determines the sponsored service as valid; generating a sponsored service between the sponsored service client and an Internet service provider server; the sponsored service server generating charged fee information and transmitting the charged fee information to an authentication/authorization/accounting (AAA) server, when the sponsored service client requests termination of the sponsored service; and terminating the sponsored service session. According to the present invention, the sponsored service, in which a third party Internet service provider can pay the cost using the mobile communication network instead of a wireless user equipment subscriber, can be provided, and the quality of the service can be dynamically controlled from the point the Internet service is provided.

8 Claims, 26 Drawing Sheets

(51) Int. Cl.
H04L 29/08 (2006.01)
H04W 4/24 (2018.01)
H04L 12/14 (2006.01)
H04W 4/00 (2018.01)
H04L 29/06 (2006.01)
H04L 12/24 (2006.01)

(52) U.S. Cl.
CPC ............ *H04L 67/14* (2013.01); *H04L 67/20* (2013.01); *H04W 4/24* (2013.01); *H04L 12/1482* (2013.01); *H04L 41/0893* (2013.01); *H04L 65/1016* (2013.01); *H04M 2215/0192* (2013.01); *H04W 4/00* (2013.01)

(58) Field of Classification Search
USPC .................. 455/406, 405, 418; 705/52
See application file for complete search history.

(56) References Cited

U.S. PATENT DOCUMENTS

| 9,350,877 | B2* | 5/2016 | Lee ................... H04L 63/0807 |
| 2005/0091157 | A1* | 4/2005 | Suzuki ............... G06Q 20/102 705/40 |
| 2006/0276171 | A1* | 12/2006 | Pousti .................. G06Q 20/02 455/405 |
| 2007/0244752 | A1 | 10/2007 | Bayne |
| 2007/0260556 | A1* | 11/2007 | Pousti .................. G06Q 20/14 705/75 |
| 2009/0265220 | A1* | 10/2009 | Bayraktar ............ G06Q 30/02 705/14.53 |
| 2010/0246536 | A1* | 9/2010 | Della-Torre ........ H04L 65/1069 370/335 |
| 2011/0022522 | A1* | 1/2011 | Sege .................... G06Q 20/32 705/75 |
| 2011/0173105 | A1* | 7/2011 | Schirilla ................ G06Q 20/12 705/34 |
| 2012/0042059 | A1* | 2/2012 | Tian .................... H04L 67/322 709/223 |
| 2013/0316708 | A1* | 11/2013 | MacPherson .......... H04W 4/02 455/435.1 |
| 2014/0137161 | A1* | 5/2014 | Park .................. H04N 21/2221 725/62 |

FOREIGN PATENT DOCUMENTS

| KR | 10-0789868 | 12/2007 |
| KR | 10-2009-0084226 | 8/2009 |
| KR | 10-2011-0023009 | 3/2011 |
| KR | 10-2011-0112280 | 10/2011 |

OTHER PUBLICATIONS

Written Opinion of International Searching Authority dated Feb. 28, 2013 in connection with International Patent Application No. PCT/KR2012/010566, 5 pages.
Korean Intellectual Property Office Office Action and English translation, dated May 29, 2017, regarding Application No. KR10-2011-0129931, 15 pages.

* cited by examiner

METHOD AND SYSTEM FOR PROVIDING SPONSORED SERVICE ON IMS-BASED MOBILE COMMUNICATION NETWORK

CROSS-REFERENCE TO RELATED APPLICATION(S)

The present application claims priority under 35 U.S.C. § 365 to International Patent Application No. PCT/KR2012/010566 filed Dec. 6, 2012, entitled "METHOD AND SYSTEM FOR PROVIDING SPONSORED SERVICE ON IMS-BASED MOBILE COMMUNICATION NETWORK". International Patent Application No. PCT/KR2012/010566 claims priority under 35 U.S.C. § 365 and/or 35 U.S.C. § 119(a) to Korean Patent Application No. 10-2011-0129931 filed Dec. 6, 2011 and which are incorporated herein by reference into the present disclosure as if fully set forth herein.

TECHNICAL FIELD

The present disclosure relates to a sponsored service provision method for an Internet Service Provider (ISP) server to pay the mobile communication network usage fee charged to the terminal in its owner's stead.

BACKGROUND ART

Typically, a mobile communication network operator provides IP-based multimedia service through IP Multimedia Subsystem (IMS) core network. In the case of the $3^{rd}$ party Internet service provider, however, it provides the mobile subscriber with the Internet service through the IP network of the mobile communication network operator without involvement of the IMS core network. The Internet service in the conventional mobile communication network is depicted conceptually in FIG. 1.

According to the conventional technology, in the case that the $3^{rd}$ party ISP provides the mobile subscribers with the Internet service, although the ISP wants to pay the mobile communication network usage fee charged for the Internet service consumed by a mobile subscriber in the mobile subscriber's stead as a means of distributing the benefit acquired from the mobile subscribers in exchange for viewing advertisement, there is no way of accomplishing this coal.

Also, since the mobile communication network retains no information on the Internet service, it is also impossible for the ISP to provide quality-differentiated services based on QoS. According to the conventional technology, since the $3^{rd}$ party ISP provides the Internet service transparently of the mobile communication network, it is impossible for the mobile communication network to differentiate among the Internet services and enhance the service quality dynamically in adaptation to the Internet service.

Furthermore, the propagation/processing delay caused by the physical distance between the mobile terminal and IPS cause the user to experience degradation of the quality of the Internet service through the mobile communication network.

DISCLOSURE OF INVENTION

Technical Problem

The present disclosure has been conceived to solve the above problem, and aims to provide a sponsored service provision method for the $3^{rd}$ party ISP to pay the mobile communication network usage fee of the mobile subscriber in consideration of diverse factors such as communication time and traffic amount in the case where the mobile subscriber uses the Internet service provided by the $3^{rd}$ party ISP through the IMS-based mobile communication network.

Also, the present disclosure is capable of providing the sponsored service with differentiated service qualities which are controlled dynamically at the start time of the corresponding Internet service and, when the sponsored service is not valid at the start time, blocking the provision of the corresponding service.

Also, the present disclosure aims to provide a sponsored service in such a way that, when traffic overload occurs due to an abrupt increase of request for specific Internet service or content at a specific area or transmission delay occurs due to the traffic overload, the content/service of the Internet service moves into the mobile communication network operator's network to provide the corresponding service at a position nearest to the mobile terminal.

Solution to Problem

In order to solve the above problem, a method for providing a sponsored service of which Internet service provider pays mobile communication usage of a mobile terminal in terminal owner's stead in an IMS-based mobile communication network includes transmitting a sponsored service start request message from a sponsored service and connectivity client of the mobile terminal to a sponsored service server, determining, at the sponsored service server, whether the sponsored service indicated in the sponsored service start request message is valid, transmitting, when the sponsored service is valid, a sponsored service start accept message from the sponsored service server to the to the sponsored service and connectivity client, establishing a sponsored service session between the sponsored service and connectivity client and the Internet service provider, transmitting, when the sponsored service and connectivity client ends the sponsored service, billing information generated by the sponsored service server from the sponsored service server to an Authentication/Authorization/Accounting (AAA) server, and terminating the sponsored service session.

Also, a system for providing a sponsored service of which Internet service provider server pays mobile communication usage of a mobile terminal in terminal owner's stead in an IMS-based mobile communication network, including a sponsored service and connectivity client included in the terminal, a sponsored service server for providing the sponsored service, the internet service provider server, and an Authentication/Authorization/Account (AAA) server, includes transmitting a sponsored service start request message from the sponsored service and connectivity client of the mobile terminal to the sponsored service server, determining, at the sponsored service server, whether the sponsored service indicated in the sponsored service start request message is valid, transmitting, when the sponsored service is valid, a sponsored service start accept message from the sponsored service server to the to the sponsored service and connectivity client, establishing a sponsored service session between the sponsored service and connectivity client and the Internet service provider, transmitting, when the sponsored service and connectivity client ends the sponsored service, billing information generated by the sponsored service server from the sponsored service server to the Authentication/Authorization/Accounting (AAA) server; and terminating the sponsored service session.

Advantageous Effects of Invention

The sponsored service provision method of the present disclosure is capable of allowing the $3^{rd}$ party ISP to pay the mobile communication network usage fee in the mobile subscriber's stead. The sponsored service provision method of the present disclosure is capable of providing differentiated service qualities which can be controlled dynamically at the start time of the corresponding Internet service. Also, the sponsored service provision method of the present disclosure is capable of checking the validity of the sponsored service at the service start time and, if the service is invalid, blocking the service in advance.

Also, the sponsored service provision method of the present disclosure is capable of providing the mobile subscriber with the service quick in response and optimized for mobile use and, if instantaneous overload occurs, barrowing processing capability and communication capacity of the mobile communication network provider, thereby negating the extra expense for instantaneous overload and satisfying the subscribers' need.

MODE FOR THE INVENTION

In the present disclosure, the term 'sponsored service' denotes the service in which the ISP pays the mobile communication network usage fee charged for the IMS-based Internet service in the mobile subscriber's stead.

Exemplary embodiments of the present disclosure are described with reference to the accompanying drawings in detail. The same reference numbers are used throughout the drawings to refer to the same or like parts. Detailed description of well-known functions and structures incorporated herein may be omitted to avoid obscuring the subject matter of the present disclosure.

Figure 1:
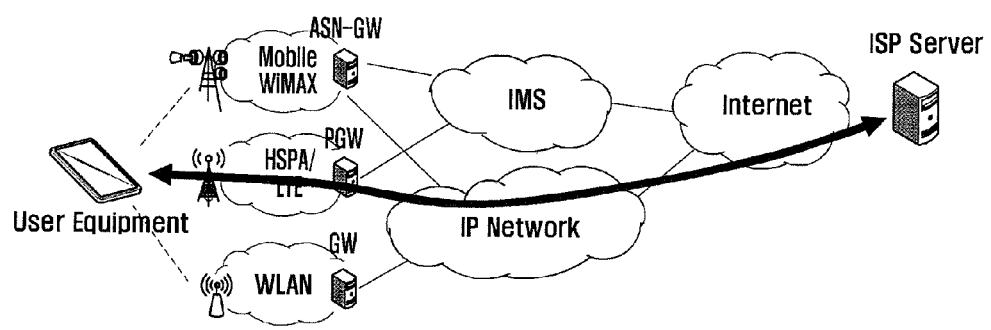
FIG. 1 is a diagram illustrating the concept of Internet service in a mobile communication network according to the conventional technology.
Figure 2:
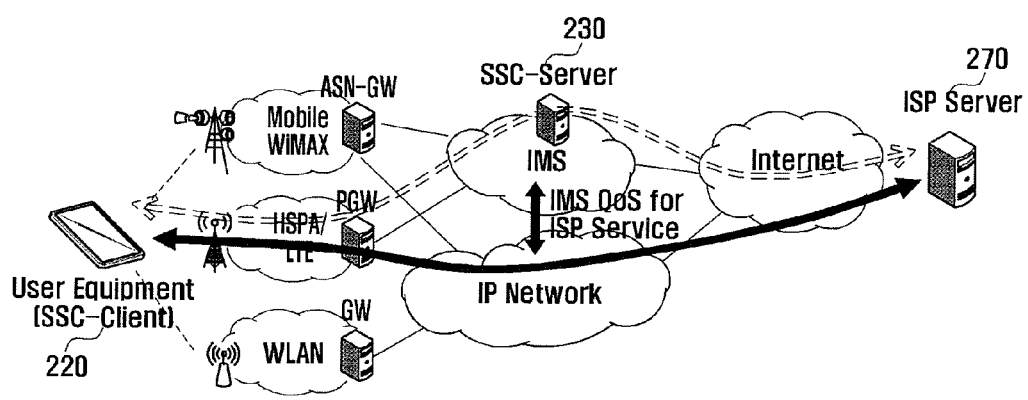
FIG. 2 is a diagram illustrating the concept of the Internet service through a mobile communication network according to an embodiment of the present disclosure.

FIG. 2 is a diagram illustrating the concept of the Internet service through a mobile communication network according to an embodiment of the present disclosure.

Unlike the conventional technology, the Internet service through mobile communication network according to an embodiment of the present disclosure is implemented with the involvement of IMS between the ISP server 270 and the mobile terminal for providing the Internet service which differs from the IMS-based service. That is, the Internet service is provided with the operation of the control plane interface through IMS core network.

According to an embodiment, the mobile terminal includes a sponsored service and connection client for receiving sponsored service. The IMS core network includes an SSC server 230 which is defined as an Application Server (AS) connected to a Call Session Control Function (CSCF) as central switching device of the IMS. Also, the ISP server 270 may include the IMS client function. Finally, a control interface is defined newly between the SSC client 220, the SSC server 230, and the ISP server 270.

The present disclosure is briefed before providing detailed description.

First, according to an embodiment of the present disclosure, there is an operating system of the mobile terminal, device driver, or SSC client 220 installed in the terminal as a (secure) basic program; and the SSC client 220 provides the upper layer application with an API. The API is called by the application operating as a sponsored service, and the application of the mobile terminal determines whether the sponsored service is valid in cooperation with the SSC server 230. Although it is not considered to identify all the Internet services in the present disclosure, the sponsored service calls the corresponding API so as to be identified although it is an Internet service.

Second, according to an embodiment of the present disclosure, the application which is intended to operate as a sponsored service calls the API of the SSC client 220. The function of the corresponding API generates an IMS control message transparently and independently of the application and receives the authentication on whether the corresponding sponsored service is valid through the IMS core network. In order to accomplish this, the sponsored service authentication request message generated by the SSC client 220 is delivered to the SSC server 230 via the CSCF 260 and, if it is determined that the sponsored service is valid, the SSC server 230 accepts the SSC client 220 of the mobile terminal immediately or sends the ISP server the IMS message again to receive permission of the ISP additionally. In this way, the validity of the sponsored service is verified by the IMS core network of the mobile communication network operator and the ISP dynamically.

Third, the conventional mobile communication network is capable of guaranteeing the QoS of IMS services but not the QoS of the $3^{rd}$ party ISP Internet services. However, the sponsored service according to an embodiment of the present disclosure is capable of being guaranteed in QoS because it is provided based on the IMS. The SSC server 230 receives the QoS information of the Internet service provided by the ISP and stores the QoS information in advance. The corresponding QoS information is transmitted to a gateway device of the mobile communication network at the time when the SSC server 230 approves the sponsored service for use in guaranteeing the same QoS as the IMS when the sponsored service traffic flows into the mobile communication network.

Fourth, according to an embodiment of the present disclosure, if the ISP intends to provide its internet service in QoS changing dynamically, it transmits a message including the QoS information required to be applied newly in the response (i.e. IMS message approving the sponsored service) in reply to the IMS-based control message such that the SSC server 230, upon receipt of the new information, transmits the new QoS information (instead of the old QoS information) to the gateway of the mobile communication network.

Fifth, according to an embodiment of the present disclosure, if it is necessary to transmit the content of the same service to a specific area due to the concentric use of a specific Internet service by a plurality of mobile terminal within the specific area, the contents for the Internet service and the service itself are moved to the corresponding service request concentration area so as to reduce the network load and improve the quality to the mobile subscribers and ISP.

In the present disclosure, it is assumed that the mobile subscriber has subscribed with the IMS core network of the mobile communication network operation basically. By subscribing with the IMS core network, the mobile subscriber is allocated an identifier (ID) from the IMS for use in receiving the sponsored service. The mobile subscriber may be allocated the ID by subscribing with the IMS service of the mobile communication network operation explicitly or explicitly. In the case of the implicit method, it is necessary for the mobile communication network operator to develop an application running on the device such as smartphone and smart-pad which is capable of calling the function of the SSC client 220 and 230 such that if the application is executed the mobile subscriber determines whether to use or not the sponsored service from now on. If it is determined to use the sponsored service, the mobile subscriber generates and ID using the corresponding application. Of course, a password for authenticating the ID is generated together. This is possible because the user calls the function of the SSC client 220 without awareness of the presence/absence of the IMS service, and performs communication with the IMS core network. In the latter case, it is recognized that the user has generated the ID to be qualified for receiving the sponsored service while hiding the presence/absence of the IMS ID against the IMS core network for convenience purpose. Afterward, the IMS ID generated for the mobile subscriber to receive the sponsored service is called sponsorship ID. The mobile subscriber generates and manages the following information.

{Sponsorship ID & Password}

The ISP providing the sponsored service registers itself with the SSC server 230 in advance. That is, the ISP is assigned an ISP ID and password through an online or offline registration procedure and, if necessary, assigned service IDs for the services to be provided as sponsored services. Also, it is necessary to register the account information for use in paying for the sponsored service consumed. Sponsored service type is the type of the sponsored service to be provided by the ISP through the mobile communication network. The sponsored service type may be any of 1) sponsored application service, 2) sponsored communication service, and 3) sponsored intelligent processing and content transmission service that are described in detail later. According to an embodiment of the present disclosure, the service supportability of 1) is expressed by 0x0001, the service supportability of 2) by 0x0010, and the service supportability 3) by 0x0100; and the sponsored service types of 1)~3) are stored using the values of 1)~3) with OR. Accordingly, the basic information which the ISP registers with the SSC server 230 is as follows. The corresponding information is managed by the SSC server 230 per ISP, and the ISP stores/manages its own information.

{ISP ID & Password, Account Info, Sponsored Service Types, Service ID#1, . . . Service #N}

The service ID may be the IMS ID as a destination address for sue in establishing IMS session and contained in the ISM control message in a format different from the IMS ID.

The individual services identified by service ID may be provided with different QoS in the mobile communication network according to the ISP's intention. For this purpose, the ISP has to request the mobile communication network operator for per-service ID QoS information additionally. This is exemplified as follows.

{Service ID#N: Minimum Bandwidth, Maximum Bandwidth, Delay, Jitter}

Each sponsored service may having the QoS parameters independently.

The QoS information may be provided with the conditional sponsored service support rule defined per service ID additionally. This means that the corresponding sponsorship service may be restricted by date and time, location, subscriber, or device type. For the purpose, the SSC server has to have the capability of managing the following informations per sponsored service from the ISP. Although the information items are exemplified as follows, other information items may be further defined.

{Service ID#N: (Allowed) Time & Date, Region, Subscribers, Terminal Types}

If a request for starting the sponsored service is generated per ISP ID, the ISP has the flag information indicating whether to approve the start of the sponsored service as follows. If the flag is set to yes, the corresponding ISP participates in lawful request authentication procedure whenever the sponsored service is requested by the mobile terminal. If the flag is set to no, the authentication request from the mobile terminal is not delivered to the ISP but processed at the level of the SSC server 230.

{ISP ID: SponsoredService_AuthCapability_Flag [=Yes or No]}

The present disclosure is described with detailed operation scenario. As described above, the ISP of providing the sponsored service registers its own information and the services to be provided with the SSC server. Also, the mobile subscriber interested in receiving the sponsored service has to register the sponsorship ID crated with the IMS ID through the SSC client 220. The above operations are performed between the mobile terminal and the ISP as follows.

Figure 3:
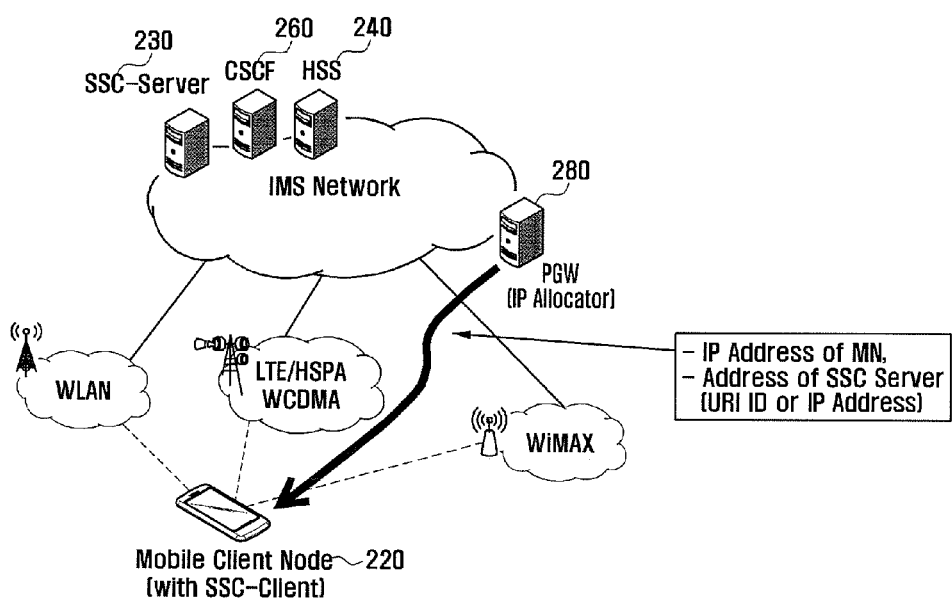
FIG. 3 is a diagram illustrating a procedure of acquiring SSC server information in connection to the mobile communication network according to an embodiment of the present disclosure.

FIG. 3 is a diagram illustrating a procedure of acquiring SSC server information in connection to the mobile communication network according to an embodiment of the present disclosure.

The mobile terminal first connects to the mobile communication network and is assigned an IP address. According to an embodiment of the present disclosure, the mobile terminal acquires the SSC server information in addition to the IP address from the mobile communication network as shown in FIG. 3.

The present disclosure is directed to the Long Term Evolution (LTE) network. Accordingly, the PDN Gateway (PGW) assigns an IP address to the mobile terminal. In an embodiment of the present disclosure, there may be one or more SSC servers in the mobile communication network. If only one SSC server exists, one server manages the entire mobile communication network area and, otherwise multiple SSC servers exist, the mobile communication network area is divided geometrically into multiple regions such that the individual SSC servers are responsible for respective regions. The mobile terminal acquires the SSC server identifier managing the mobile communication network in the process of being assigned the IP address. The SSC server identifier is formatted in the form of IMS ID.

According to another embodiment, if the mobile terminal depends on a specific provider, it is also possible to plant the SSC server address of the mobile communication network in the SSC client 220 of the terminal in the form of Uniform Resource Identifier (URI) in advance. In this case, if the mobile communication network operator operates a single SSC server, single IP address corresponding to the URI exists and, otherwise if the mobile communication network operator operates multiple SSC servers, multiple IP addresses corresponding to the respective URIs exist. In the latter case, in order for the mobile terminal connected to the mobile communication network to convert the preconfigured URI of the SSC server to an IPI address through Domain Name Service (DNS), the URI is sent to the mobile communication network. Upon receipt of the URI, the mobile communication network may transmit the IP address of the SSC server managing the corresponding area based on the location information of the mobile communication network requested by the corresponding mobile terminal.

Figure 4:
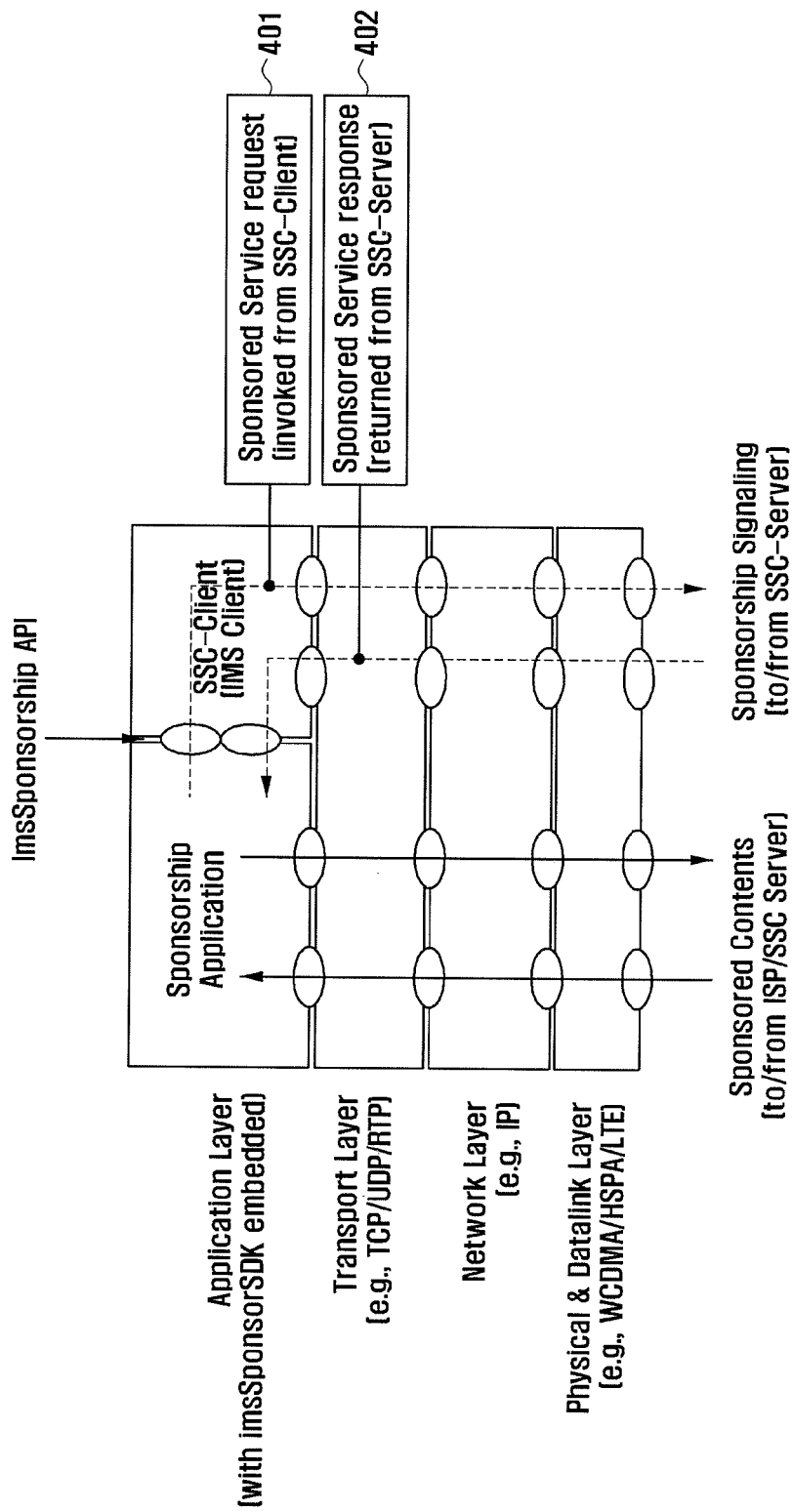
FIG. 4 is a diagram illustrating the internal architecture of the mobile terminal according to an embodiment of the present disclosure.

FIG. 4 is a diagram illustrating the internal architecture of the mobile terminal according to an embodiment of the present disclosure.

As shown in FIG. 4, the SSC client 220 includes the IMS client function with which the application executes the corresponding function through API. The application does not need to know whether the SSC client 220 is IMS protocol and experiences the IMS connection-based sponsored service through a simplified command.

According to an embodiment of the present disclosure, the application may execute the following command at the start time of the sponsored service.

Sponsorship_Auth_Request(targetISPaddress, sponsorship_option);

The above command carries the destination address of the sponsored service which is represented by targetISPaddress and expressed in the form of ISP ID or Service ID. The targetISPaddress may be the IP address of the ISP server, and the ISP ID or service ID may be written in sponsorship_option.

In replay to the request for the valid sponsored service, the SSC client 220 may send a response as follow.

Sponsorship_Auth_Response("OK", reasonCode);

This means that the sponsored service is authenticated successfully. The reasonCode is used when it is necessary for the SSC client 220 to send additional information to the application separately. If authentication fails, the response is transmitted to the application as follows.

Sponsorship_Auth_Response("NOK", reasonCode);

Depending on the implementation of the SSC client 220, the operating system developer may embodies the SSC client in the operating system or the mobile communication network operator may provide the ISP with the SSC client in the form of Software Development Kit (SDK) or Device-driver Development Kit (DDK) such that the ISPs distributes the applications including the SSC client. Also, it is possible that the mobile communication network operator distributes the SSC client as supplementary program running on the operating system.

As described above, the sponsored services may be sorted into 1) sponsored application service, 2) sponsored communication service, and 3) sponsored intelligent processing and content transmission service. Descriptions thereon are made in detail hereinafter.

Figure 5:
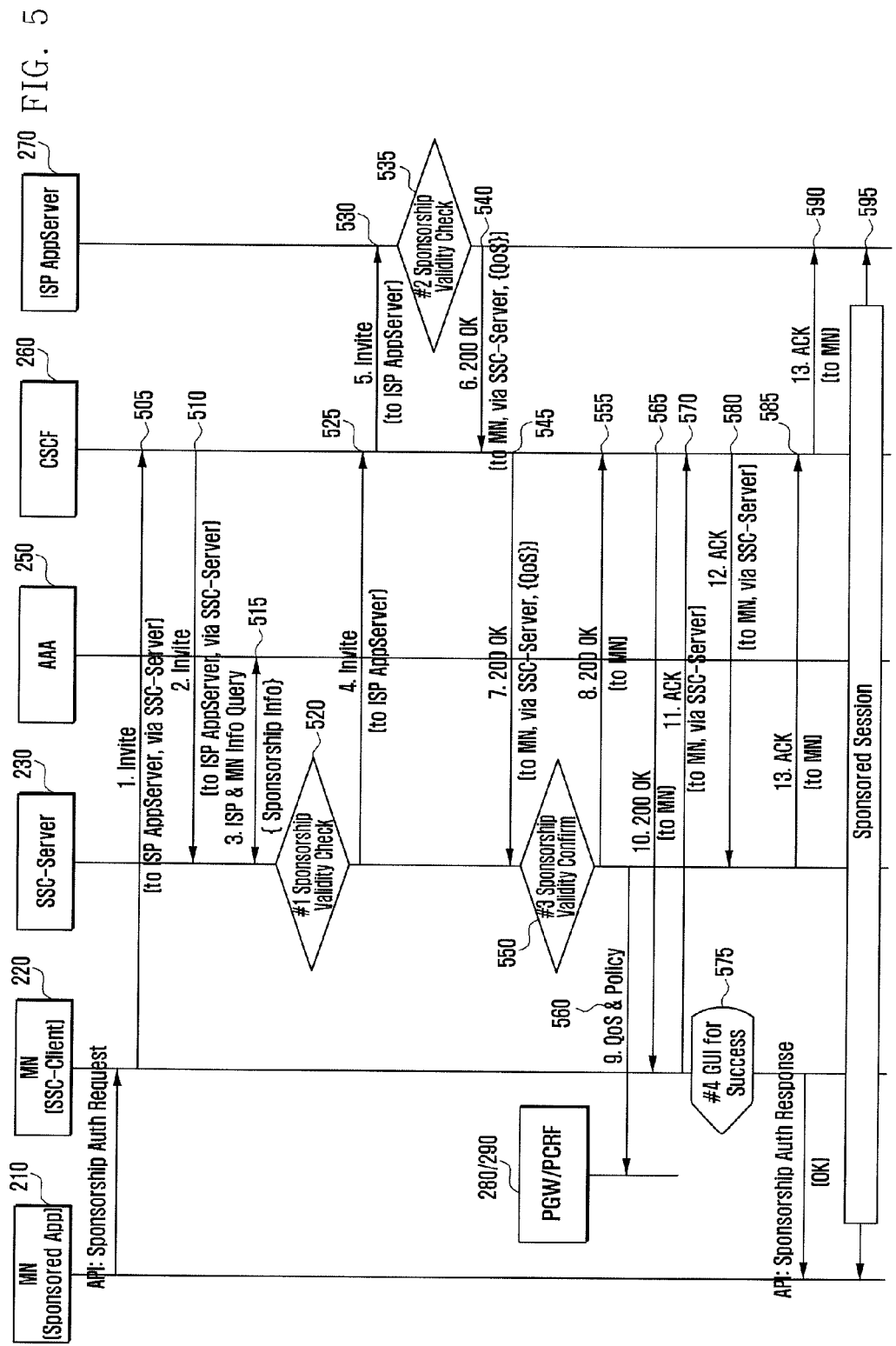
FIG. 5 is a signal flow diagram illustrating a sponsored application service authentication procedure according to an embodiment of the present disclosure.

The sponsored application service initiation procedure is depicted in FIG. 5. FIG. 5 is a signal flow diagram illustrating a sponsored application service authentication procedure according to an embodiment of the present disclosure.

The application 210 supporting the sponsored service of the mobile terminal calls the API from the SSC client 220, and the API requests the SSC client 220 to start the sponsored service. Upon receipt of the sponsored service start request, the SSC client 220 sends the CSCF a sponsored service start request message as an IMS message at operation 505. In the drawing, the sponsored service start request message is represented by the Invite message. According to an embodiment of the present disclosure, the destination address of the IMS message corresponds to the service ID selected among the IPS ID and service ID registered initially by the ISP, and the description is made under the assumption that the service ID is formatted in the form of ISM ID. Of course, the above-described ISP ID or IP address may be combined in various manners.

The destination address of the Invite message is set to the service ID while the via field of the Invite message has to be filled with the ID (or address) of the SSC server 230. This means that the Invite message has to be transmitted via the SSC server inevitably in the case of the sponsored service. Accordingly, the CSCF transmits the Invite message to the SSC server at operation 510.

Upon receipt of the Invite message, the SSC server 230 sends the AAA server 250 an inquiry to acquire the information on the ISP and the mobile terminal which includes the sponsored service information at operation 515.

If the Invite message is received from the mobile terminal 220, the SSC server 230 checks the internal database to determine whether the information on the ISP designated as destination is correct and the ISP is registered as valid sponsor at operation 520. If the sponsored service use request is made to the valid sponsor, the SSC server 230 checks whether additional conditions for the sponsored service authentication exists and, if so, determines whether the current request fulfils the additional condition. The additional condition may include the aforementioned sponsored service authentication date/time, location, and terminal type. The data/time information is checked by referencing the current time and, if there is ISP request and mobile subscriber authentication, it is possible to extract the information on the mobile subscriber for assessment. Likewise, the AAA server 250 or the Device Manager (DM) server may extract and check the type of the terminal based on the information on the mobile subscriber.

If there is no problem in the conditions, the SSC server 230 checks the SponsoredService_AuthCapability_flag of the ISP supporting the corresponding sponsored service. If the flag is set to yes, the SSC server 230 sends the CSCF 260 the Invite message at operation 525, and the CSCF 260 forwards the Invite message to the ISP server 270 at operation 530. If the Invite message is received, the ISP checks the sponsored service start request for itself.

The ISP checks the sponsored service start request by itself in the following situations. When the ISP determines whether the sponsored service is supported dynamically, when the ISP wants to acquire the statistical information on the mobile terminal, and when the ISP wants to adjust the QoS of the sponsored service, the ISP may check the sponsored service start request by itself. At this time, the destination address of the Invite message may be the ISP ID or service ID or the IP address after containing the aforementioned information as internal data.

The ISP determines whether the sponsored service use requested to a valid sponsor at operation 535. If it is determined that the request is valid, the ISP server 270 sends the CSCF 260 a start accept message at operation 540. In the drawing, the start accept message is represented by 200 OK message. At this time, if it is required to change the QoS dynamically, the QoS information on the sponsored service may be carried in the 200 OK message as supplementary information.

The CSCF 260 sends the SSC server 230 the 200 OK message at operation 545. In the case that the QoS information is included, the SSC server 230 updates the retained QoS information with the received QoS information. The SSC server 230 checks the 200 OK message to verify the validity of the sponsored service at operation 550, sends the CSCF 260 a start accept message at operation 555, and sends the PGW/PCRF the QoS information and policy at operation 560. Afterward, the CSCF 260 forwards the start accept message to the SSC client 220 at operation 565.

The SSC client 330 sends the CSCF 260 a reception acknowledgement message at operation 570. In drawing, the reception acknowledgement message is represented by ACK message. The CSCF 260 sends the SSC server 230 the ACK message at operation 580, the SSC server 230 sends the CSCF 260 the ACK message at operation 585, and the CSCF 260 sends the ISP server 270 the ACK message at operation 590.

After transmitting the ACK message to the CSCF 260 at operation 570, the SSC client 220 presents the sponsored service connection success through Graphic User Interface (GUI). This is performed independently of the application in order for the user to use the sponsored service securely.

After the ISP server 270 checks the ACK message, a sponsored service session is established between the application 210 and the ISP server 270 at operation 595.

Figure 6:
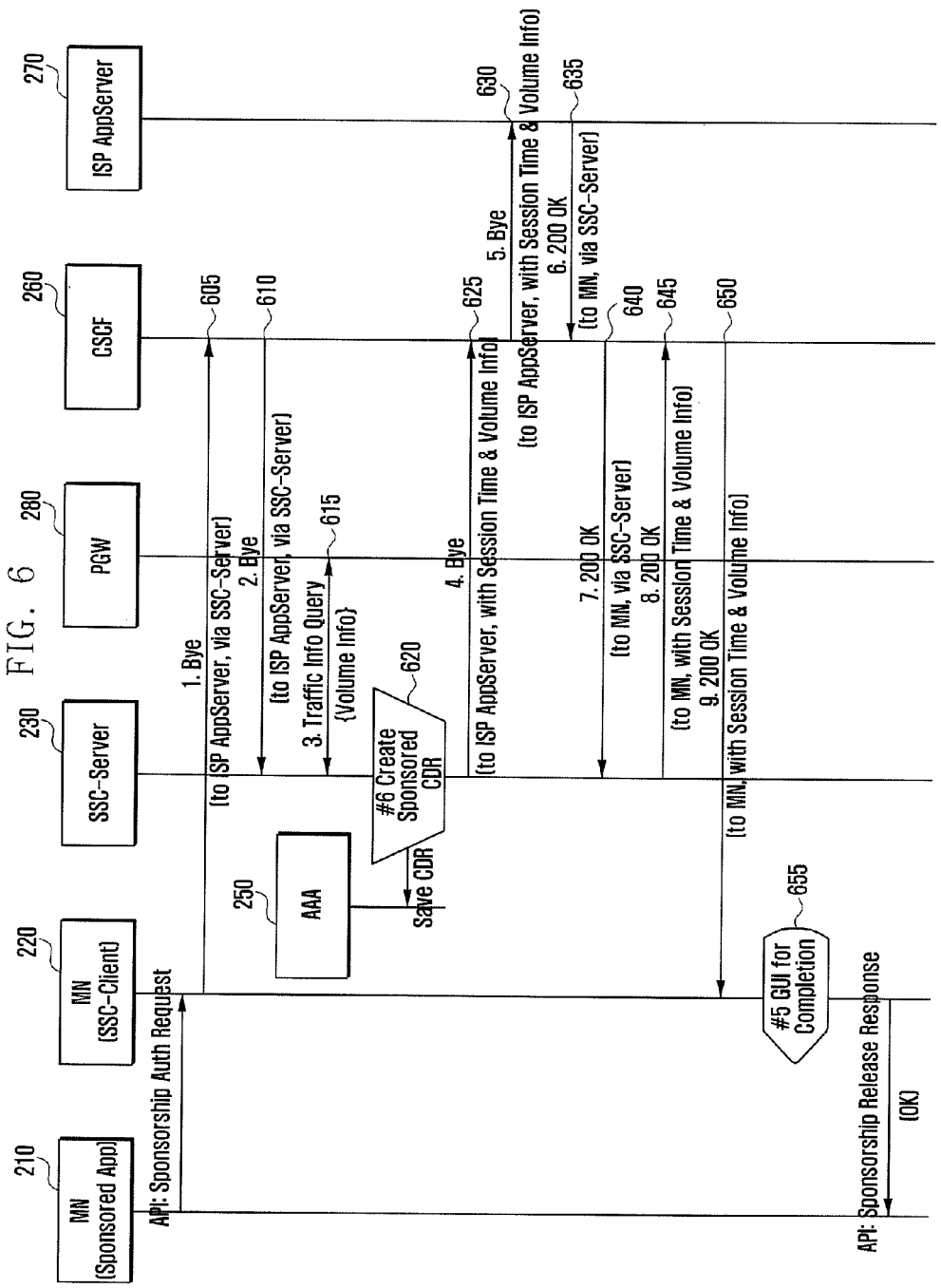
FIG. 6 is a signal flow diagram illustrating a sponsored application service release procedure according to an embodiment of the present disclosure.

FIG. 6 is a signal flow diagram illustrating a sponsored application service release procedure according to an embodiment of the present disclosure.

The procedure of FIG. 6 is performed when the mobile user terminates the sponsored service. The application 210 calls Sponsorship_Release_Request( ) for releasing the sponsored service through an API. Then the SSC client 220 sends the CSCF 260 a termination request message at operation 605. The termination request message is represented by Bye message as an IMS message in the drawing. The CSCF forwards the Bye message to the SSC server.

If the message is received, the SSC server 230 detects the release of the corresponding service, and the PGW 280 collects the information on the traffic amount of the corresponding sponsored service at operation 615. The SSC server 230 sends the Authentication/Authorization/Accounting (AAA) server 250 the collected information in the format of Call Detail Recording (CDR) understandable by the billing server at operation 620. Afterward, the SSC server 230 sends the CSCF the Bye message at operation 625, and the CSCF sends the Bye message to the ISP server at operation 630.

At this time, the SSC server 230 processes the billing information such as traffic amount received from the PGW 280 in the format understandable by users and sends the ISP the Bye message including the information. In this way, the ISP is capable of checking the statistical information on the billing immediately whenever the sponsored service session ends.

The ISP sends the CSCF a release accept message in response to the Bye message at operation 635. The release accept message is represented by the 200 OK message in the drawing. The CSCF sends the SSC server 230 the 200 OK message at operation 640, the SSC server 230 sends the CSCF 260 the 200 OK message at operation 645, and the CSCF sends the SSC client 220 the 200 OK message at operation 650. At this time, the 200 OK message includes the statistical information about the billing like the Bye message.

Then the SSC client 200 presents the billing information to the mobile user at operation 655 so as to inform of the consumed sponsored service fee in real time. Finally, the SSC client 220 delivers Sponsorship_Release_Response( ) to the application through the API.

Figure 7:
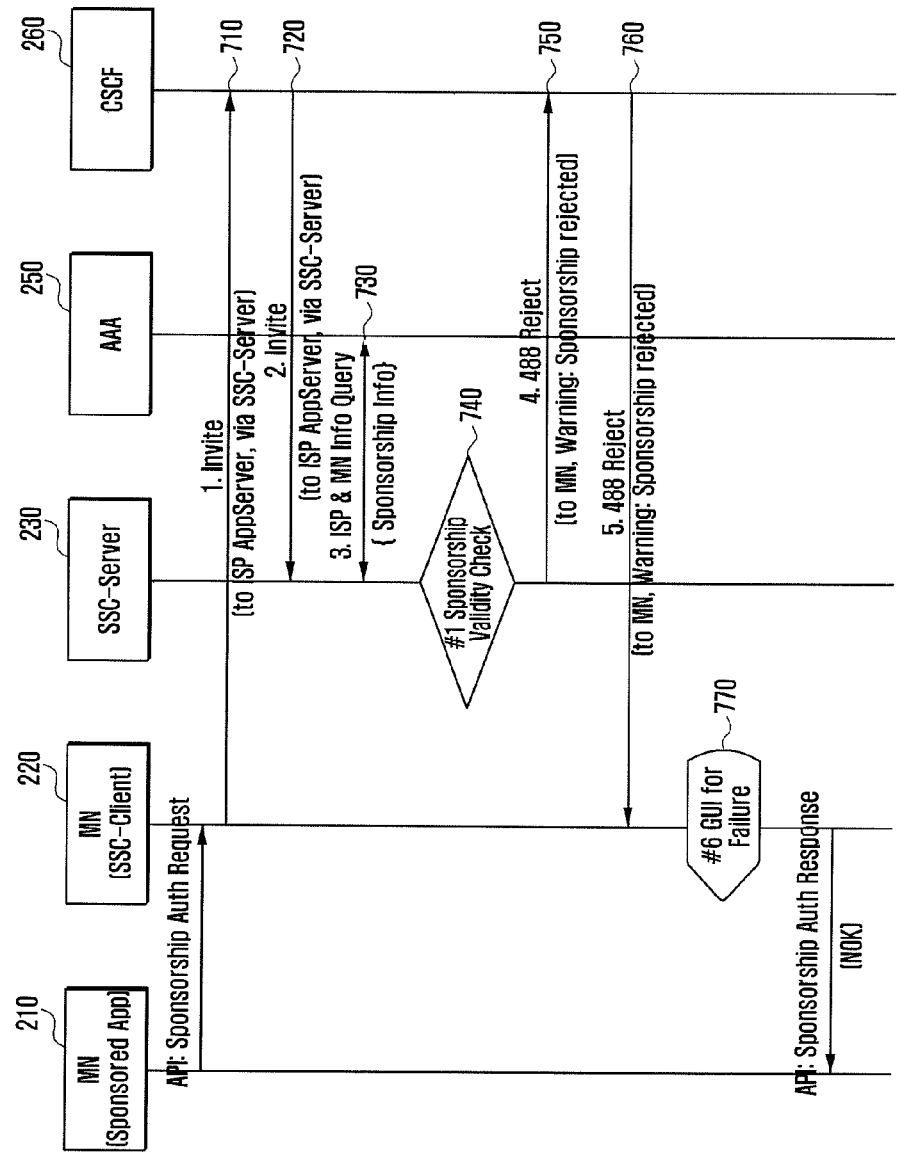
FIG. 7 is a signal flow diagram illustrating an sponsored application service authentication reject procedure according to an embodiment of the present disclosure.
Figure 8:
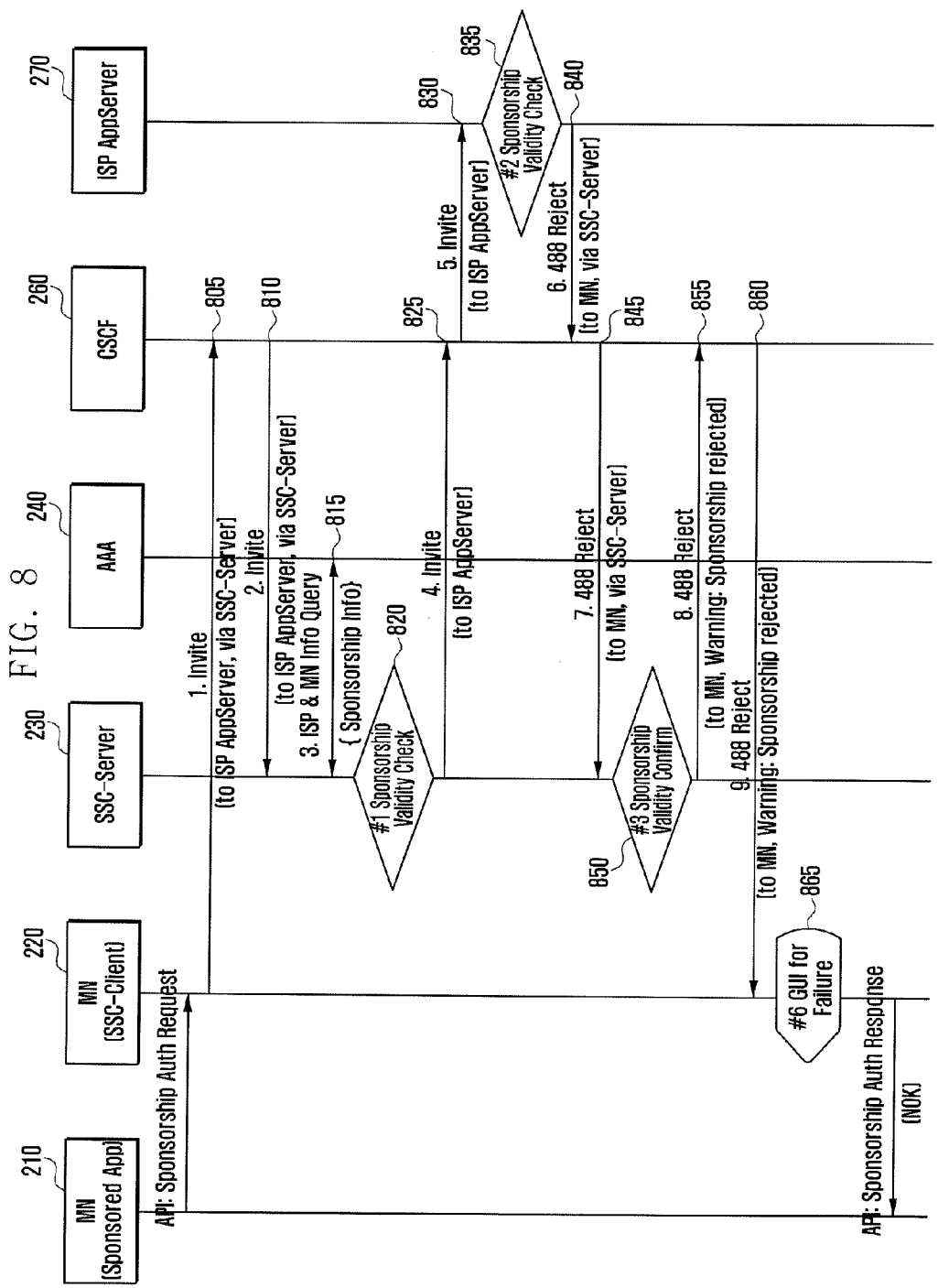
FIG. 8 is a signal flow diagram illustrating an sponsored application service authentication reject procedure according to another embodiment of the present disclosure.

FIG. 7 is a signal flow diagram illustrating a sponsored application service authentication reject procedure according to an embodiment of the present disclosure, and FIG. 8 is a signal flow diagram illustrating a sponsored application service authentication reject procedure according to another embodiment of the present disclosure.

FIG. 7 is directed to the case where the SSC server 230 rejects authentication for the sponsored service, and FIG. 8 is directed to the case where the ISP server 260 rejects authentication for the sponsored service. Each server checks the validity of the sponsored service at a certain time point and, if the service is invalid, transmits the authentication reject message to the terminal. In this case, it is impossible to receive the corresponding sponsored service using the mobile terminal.

In FIG. 7, the application 210 supporting the sponsored service of the mobile terminal calls an API from the SSC client 220, and the API requests the SSC client 220 to start the sponsored service. Upon receipt of the sponsored service start request, the SSC client 220 sends the CSCF the sponsored service start request message as an IMS message at operation 710. The sponsored service start request message is represented by the Invite message. Afterward, the CSCF sends the SSC server the Invite message at operation 720.

Upon receipt of the Invite message, the SSC server 230 sends the AAA server 250 an inquiry to acquire the information on the ISP and mobile terminal along with the sponsored service information at operation 730.

If the Invite message is received from the mobile terminal 220, the SSC server 230 looks up the internal database to determine whether the information on the ISP designated as destination is registered as a correct and valid sponsor at operation 740. If it is determined that the sponsored service use request is of an invalid sponsor, the SSC server 230 sends the CSCF 260 an authentication reject message at operation 750. The authentication reject message is represented by the 488 Reject message in the drawing.

The CSCF 260 sends the SSC client 220 the 488 Reject message at operation 760. Afterward, the SSC client 220 presents the sponsored service connection failure notification through its Graphical User Interface (GUI). Finally, the SSC client 220 notifies the application 210 of the sponsored service connection failure through the API.

In FIG. 8, the application supporting the sponsored service of the mobile terminal calls an API from the SSC client 220, the API requests the SSC client 220 to start the sponsored service. Upon receipt of the sponsored service start request, the SSC client 220 sends the CSCF the sponsored service start request message as an IMS message at operation 805. The sponsored service start request message is represented by the Invite message. Afterward, the CSCF sends the SSC server the Invite message at operation 810.

Upon receipt of the Invite message, the SSC server 230 sends the AAA server 250 an inquiry to acquire the information on the ISP and mobile terminal along with the sponsored service information at operation 815.

If the Invite message is received from the mobile terminal 220, the SSC server 230 looks up the internal database to determine whether the information on the ISP designated as destination is registered as a correct and valid sponsor at operation 820. If it is determined that the sponsored service use request is of an invalid sponsor, the SSC server 230 determines whether there is additional conditions for authenticating the corresponding sponsored service and, if so, determines whether the current request fulfills the additional conditions. The additional conditions may include the sponsored service authentication data/time, location, and terminal type. The date/time information is determined by referencing the current time, and the location is of a wide area address based on the IP address of the terminal and, if requested by ISP and authenticated by mobile subscriber, it is possible to extract and assess the current location of the terminal based on the corresponding mobile subscriber information. Likewise, the AAA server 250 or the Device Manager (DM) server may extract and check the type of the terminal based on the information on the mobile subscriber.

If there is no problem in the conditions, the SSC server 230 checks the SponsoredService_AuthCapability_Flag of the ISP supporting the corresponding sponsored service. If the flag is set to yes, the SSC server 230 sends the CSCF 260 the Invite message at operation 825, and the CSCF 260 forwards the Invite message to the ISP server 270 at operation 830. If the Invite message is received, the ISP checks the sponsored service start request for itself.

The ISP server determines whether the sponsored service use request is made to a valid sponsor at operation 835. It the ISP is not valid, the ISP server 270 sends the CSCF 260 an authentication reject message at operation 840. The authentication reject message is represented by the 488 Reject message in the drawing.

The CSCF 260 forwards the 488 Reject message to the SSC server 230 at operation 845. The SSC server 230 checks the 488 Reject message to determine whether the sponsored service is valid at operation 850 and, if invalid, sends the SSC client 220 the 488 Reject message via the CSCF 260 at operations 855 and 860. Afterward, the SSC client 220 presents the sponsored service connection failure through its Graphic User Interface (GUI). Finally, the SSC client 220 notifies the application 210 of the sponsored service connection failure through the API.

In the embodiment of FIG. 5, the ISP has to have the capability of understanding the IMS, and the server has to include the function for processing the IMS. However, it is difficult to add the IMS function to the legacy service server, and it may be burdensome for the ISP to understand IMS as the technology for the mobile communication network and telecommunication network operators. A simplified procedure for solving this problem is depicted in FIGS. 9 and 10.

Figure 9:
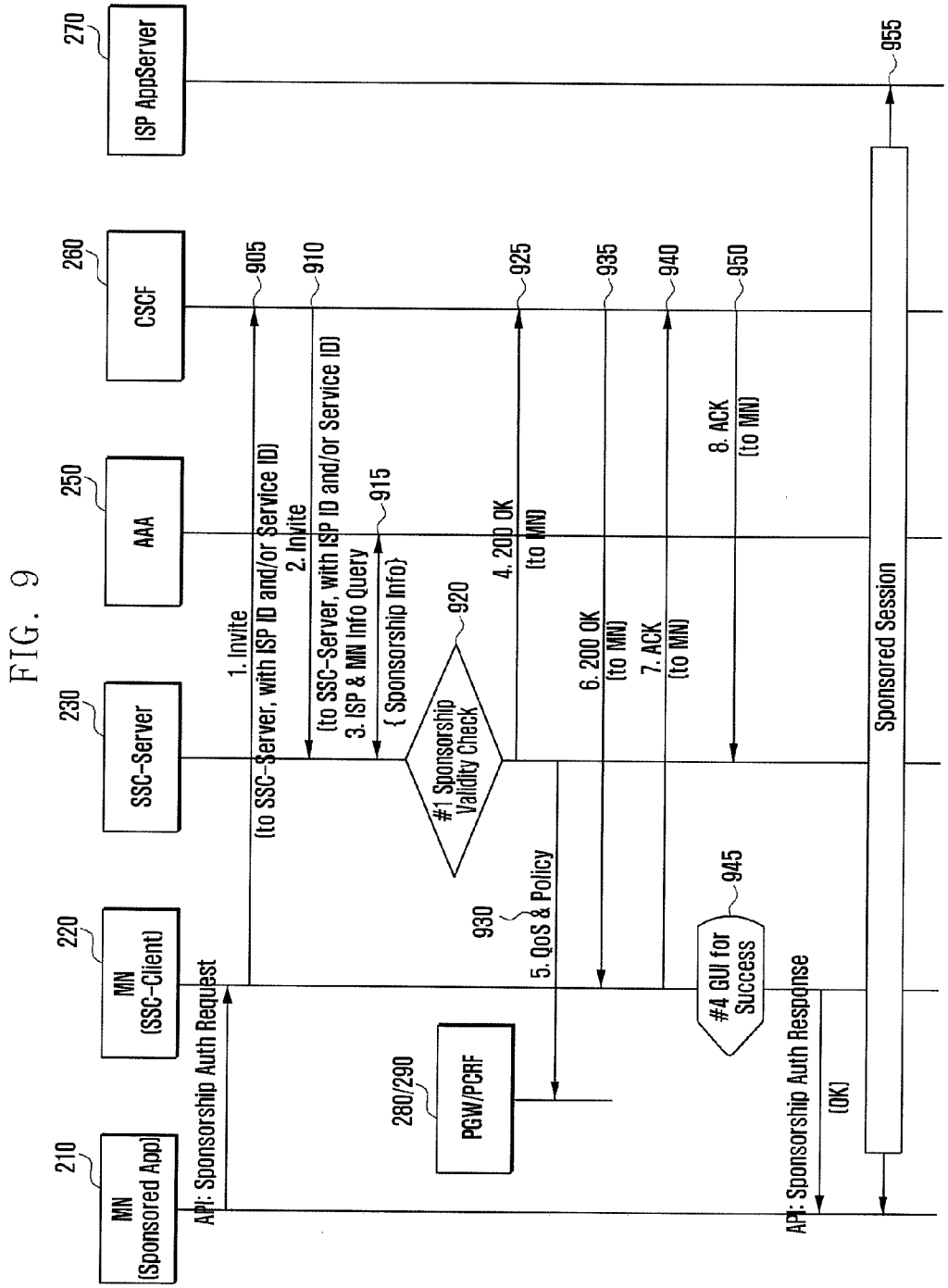
FIG. 9 is a signal flow diagram illustrating a simplified sponsored application service authentication procedure according to an embodiment of the present disclosure.
Figure 10:
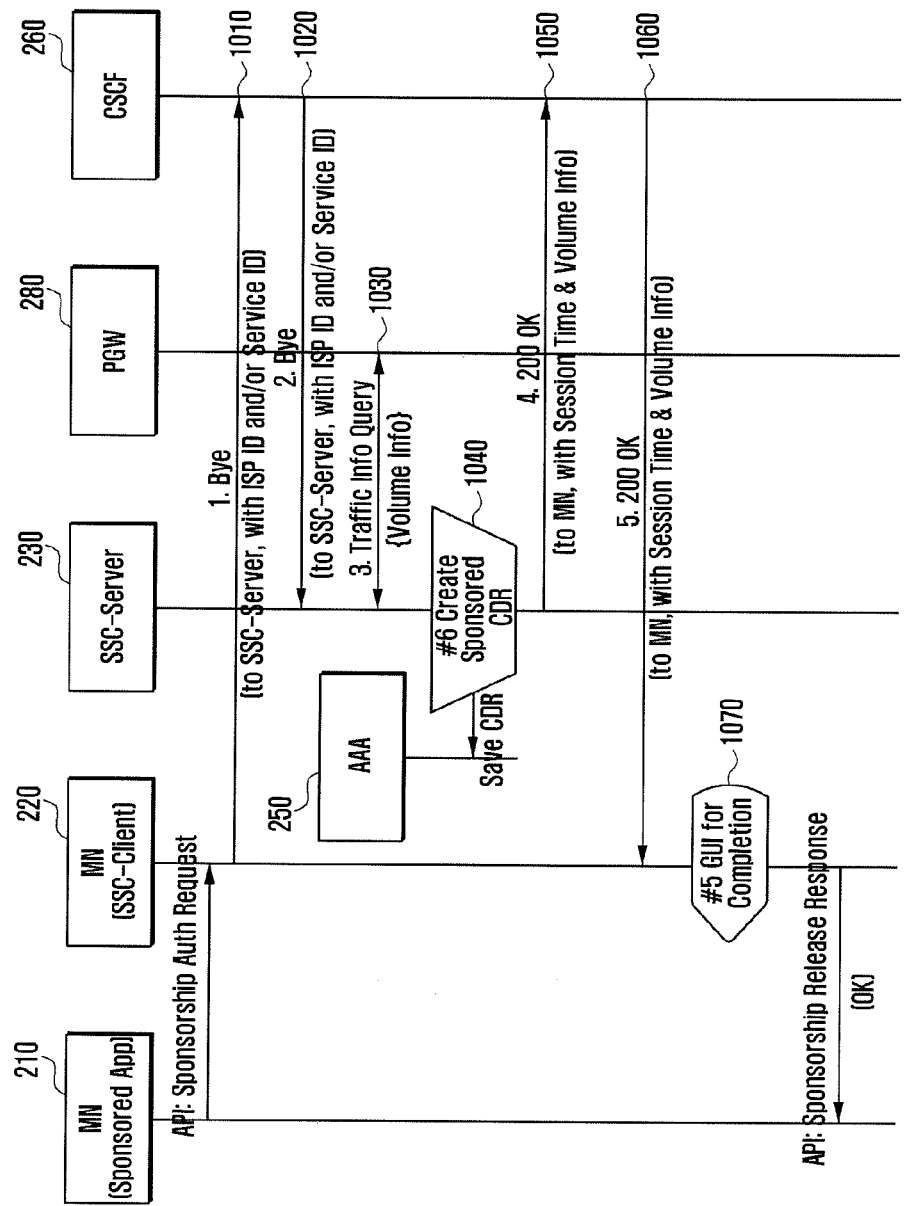
FIG. 10 is a simplified sponsored application service release procedure according to an embodiment of the present disclosure.

FIG. 9 is a signal flow diagram illustrating a simplified sponsored application service authentication procedure according to an embodiment of the present disclosure, and FIG. 10 is a simplified sponsored application service release procedure according to an embodiment of the present disclosure.

The embodiment of FIG. 9 may be a subset of the FIG. 5 basically. That is, if the SSC server 230 determines the sponsored service, a corresponding response is sent to the mobile terminal immediately. Accordingly, the procedure differs from FIG. 5 in that the final destination of the Invite message is the SSC server 230 such that the ISP ID and service ID is delivered to the SSC server 230 as the data of the Invite message for identifying the sponsored message. Other processes are identical with those of FIG. 5.

In detail, operations 905 to 920 are identical with operations 505 to 520. If the Invite message is received, the SSC server 230 looks up the internal database to determine whether the information on the ISP as the destination is registered with a valid sponsor at operation 920. If the sponsored service use request is made to the valid sponsor, the SSC server 230 checks whether there is additional conditions for authentication of the corresponding sponsored service and, if so, determines whether the current request fulfils the additional conditions. The additional conditions may include the sponsored service authentication data/time, location, and terminal type. The date/time information is determined by referencing the current time, and the location is of a wide area address based on the IP address of the terminal and, if requested by ISP and authenticated by mobile subscriber, it is possible to extract and assess the current location of the terminal based on the corresponding mobile subscriber information. Likewise, the AAA server 250 or the Device Manager (DM) server may extract and check the type of the terminal based on the information on the mobile subscriber.

If there is no problem in the conditions, the SSC server 230 sends the CSCF 260 the start accept message at operation 925 instead of checking the SponsoredService_Auth-Capability_Flag of the ISP supporting the corresponding sponsored service as in FIG. 5. The start accept message is represented by the 200 OK message in the drawing. In this case, it is impossible for the ISP change the QoS dynamically.

The CSCF 260 forwards the 200 OK message to the SSC client 220 at operation 935. The SSC client sends the CSCF 260 a reception acknowledgement message at operation 940. The reception acknowledgement message is represented by the ACK message in the drawing. The CSCF 260 sends the SSC server 230 the ACK message at operation 950.

After transmitting the ACK acknowledgement message to the CSCF 260, the SSC client 220 presents the sponsored service connection success through its Graphic User Interface (GUI). This is performed independently of the application in order for the user to use the sponsored service securely.

Afterward, the sponsored service session is established between the application 210 and the IPS server 270 at operation 955.

It also may be considered that the SSC server 230 performs the final operation even in the connection release procedure as shown in FIG. 6, and the procedure is depicted in FIG. 10. Like FIG. 9, the final destination of the Bye message is the SSC server 230, and the ISP ID and service ID is sent to the SSC server 230 as the data of the Bye message for identifying the sponsored service. Other processes are identical with those of FIG. 6.

In detail, operations 1010 to 1040 are identical with operations 605 to 620. The SSC server 230 sends the CSCF 260 the release accept message at operation 1050. The release accept message is represented by the 200 OK message in the drawing. The CSCF 260 sends the SSC client 220 the 200 OK message at operation 1060. At this time, the 200 OK message includes the statistical information for billing like the Bye message.

Upon receipt of the message, the SSC client 220 presents the billing information to the mobile user so as to check the consumed sponsored service fee immediately upon the service release at operation 1070. Finally, the SSC client 220 sends the application the Sponsorship_Release_Response( ) through the API.

Figure 11:
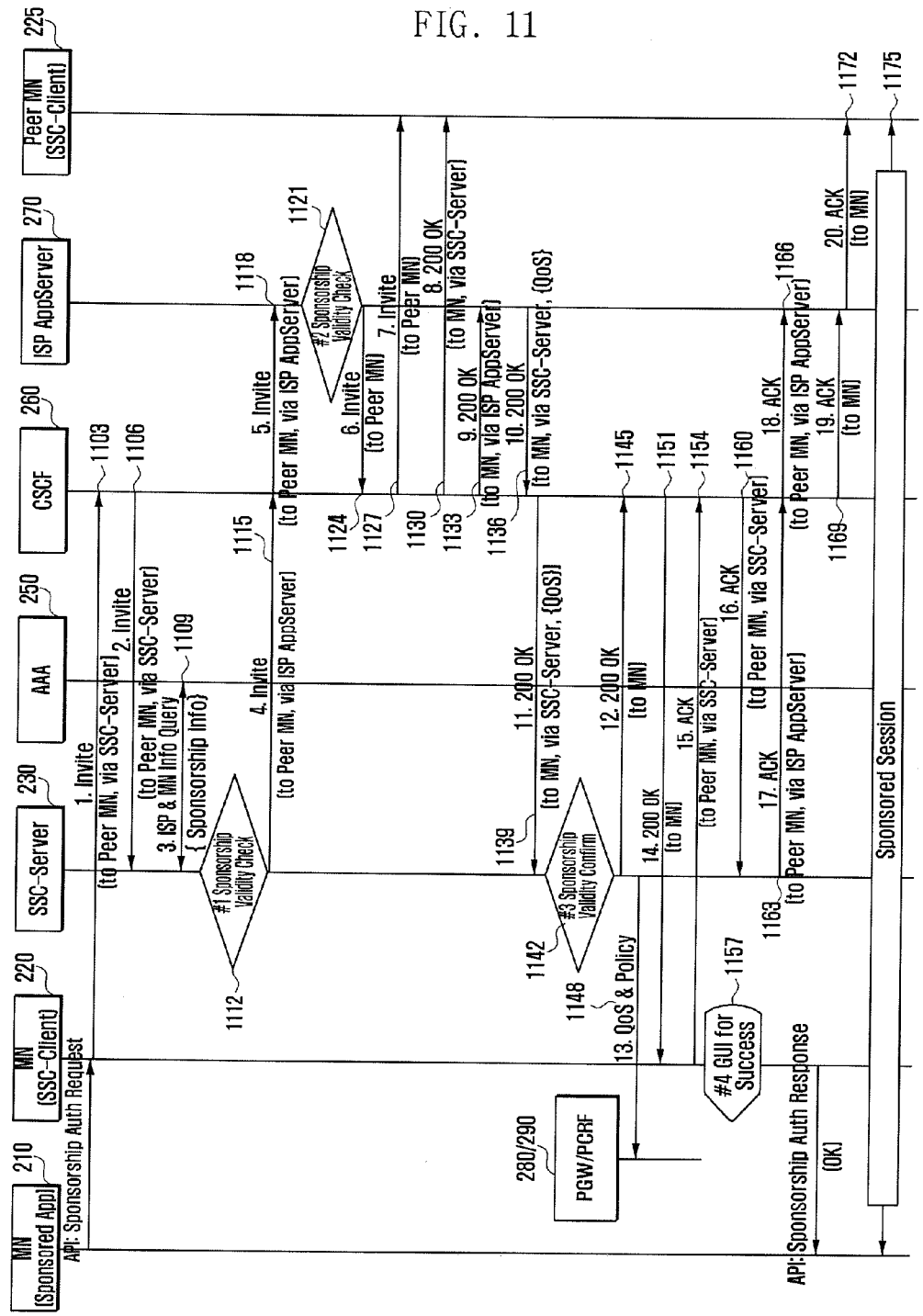
FIG. 11 is a signal flow diagram illustrating a sponsored communication service authentication procedure according to an embodiment of the present disclosure.

The sponsored communication service initiation procedure is depicted in FIG. 11. FIG. 11 is a signal flow diagram illustrating a sponsored communication service authentication procedure according to an embodiment of the present disclosure.

The sponsored communication service differs from the sponsored application service in that the mobile subscriber receives the communication service of the mobile communication network operation such as voice/video call other than the service provided by the ISP server under the condition that the ISP pays for the cost of the service in the mobile subscriber's stead.

This is implemented in such a way that the calls between subscribers of a company is processed based on the IMS of the mobile communication network but the cost is paid by the company. Even in the case where communication service is required between the users in association with the service provided by the ISP (e.g. communication between a mobile user and the person in charge), it may be considered that the ISP does not develop and manage the communication service for itself but barrows the infra of the mobile communication network operator.

In detail, the application 210 supporting the sponsored service of the mobile terminal calls the API from the SSC client 220 and the API requests the SSC client 220 to start the sponsored service. Upon receipt of the sponsored service start request, the SSC client 220 sends the CSCF a sponsored service start request message as an IMS message at operation 1103. In the drawing, the sponsored service start request message is represented by the Invite message.

The destination address of the IMS Invite message is of the peer subscriber, and the via field indicates the SSC server 230. In this case, the message includes a data field containing the ISP ID and service ID for notifying that the ISP supports the corresponding communication service. The service ID may be assigned for the communication service and, in this case, is configured for use of differentiating QoS of the communication service requested by the ISP from others. Afterward, the CSCF 260 sends the SSC server 230 the Invite message at operation 1106.

After receiving the Invite message, the SSC server 230 sends the AAA server 250 an inquiry to acquire the information on the ISP and mobile terminal along with the sponsored service information at operation 1109.

If the peer terminal supports the IMS communication too, the SSC server 230 determines whether the sponsored service is valid based on the ISP ID in the data field of the Invite message and whether there is QoS parameter configuration information of gateway based on the service ID at operation 1112. If it is the valid sponsored service use request, the SSC server 230 sends the CSCF 260 the Invite message at operation 1115, and the CSCF 260 sends the ISP server 270 the Invite message at operation 1118. The ISP ID included in the message transmitted by the mobile terminal is carried in the via field.

The ISP determines whether the sponsored service use request is made to a valid sponsor at operation 1121. If it is determined that the ISP is valid, the ISP server 270 sends the CSCF 260 the Invite message at operation 1124. The CSCF 260 forwards the Invite message to the peer mobile terminal 225 at operation 1127.

After checking the Invite message, the peer mobile terminal 225 sends the CSCF 260 a start accept message at operation 1130. The start accept message is represented by the 200 OK message in the drawing. The CSCF 260 sends the 200 OK message to the ISP server 270 at operation 1133, the ISP server 270 checks and sends the 200 OK message to the CSCF 260 at operation 1136, and the CSCF 260 sends the 200 OK message to the SSC server 230 at operation 1139.

The SSC server 230 checks the 200 OK message to verify the validity of the sponsored service at operation 1142, sends the CSCF 260 the start accept message at operation 1145, and sends the SSC client 220 the start accept message at operation 1154.

The SSC client 220 sends the CSCF 260 a reception acknowledgement message at operation 1154. The reception acknowledgement message is represented by the ACK message in the drawing. The CSCF 260 sends the SSC server 230 the ACK message at operation 1160, the SSC server 230 sends the CSCF 260 the ACK message at operation 1163, and the CSCF 260 sends the is server 270 the ACK message at operation 1166. The ISP server 270 sends the CSCF 260 the ACK message at operation 1169, and the CSCF 260 sends the peer terminal 225 the ACK message at operation 1172.

After sending the ACK message to the CSCF 260, the SSC client presents the sponsored service connection success through its Graphic User Interface (GUI) at operation 1157. This is performed independently of the application in order for the user to use the sponsored service securely.

After checking the ACK message, the peer terminal 225 establishes a sponsored service session between the application 210 and the ISP server 270 at operation 1175.

Since the sponsored communication service connection release procedure is similar to the embodiment depicted in FIG. 6, detailed description thereon is omitted herein.

Figure 12:
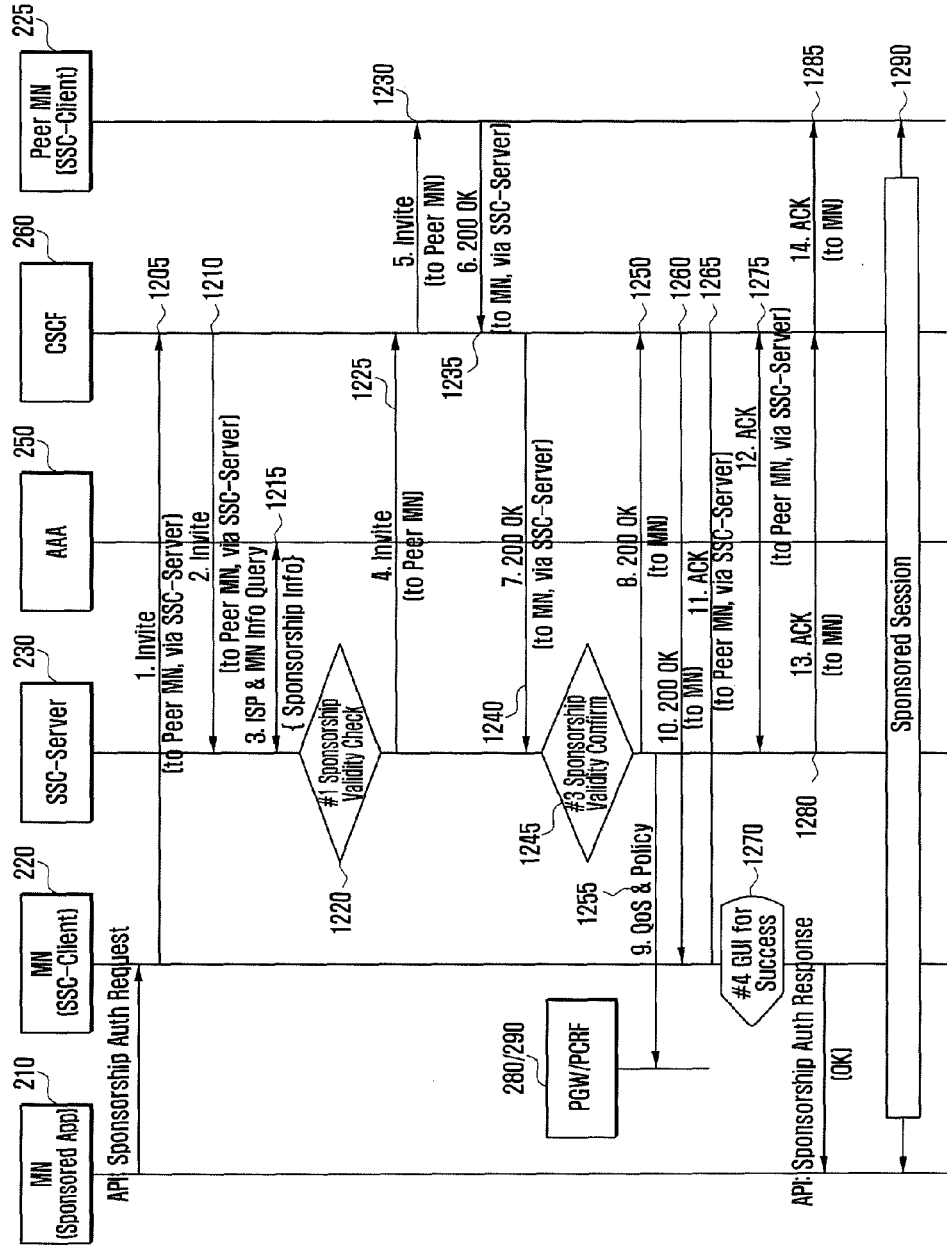
FIG. 12 is a signal flow diagram illustrating the simplified sponsored communication service authentication procedure according to an embodiment of the present disclosure.

It is also possible to implement the sponsored communication service such that the ISP does not know IMS like the above described sponsored application service. As a simplified structure of the embodiment of FIG. 11, a procedure of making a final decision of the SSC server 230 is depicted in FIG. 12. With the exception that there is no ISP in the connection setup procedure, the individual nodes are responsible for the same functions as the embodiment depicted in FIG. 11.

FIG. 12 is a signal flow diagram illustrating the simplified sponsored communication service authentication procedure according to an embodiment of the present disclosure.

In detail, operations 1205 to 1225 are identical with operations 1103 to 1115. The CSCF 260 sends the peer mobile terminal 225 the Invite message at operation 1230. After checking the Invite message, the peer mobile terminal 225 sends the CSCF 260 a start accept message at operation 1235. The start accept message is represented by the OK message in the drawing. The CSCF 260 forwards the 200 OK message to the SSC server 230 at operation 1240.

The SSC server 230 checks the 200 OK message to verify the validity of the sponsored service at operation 1245, sends the CSCF 260 the start accept message at operation 1250, and sends the PGW/PCRF the QoS information and Policy at operation 1255. Afterward, the CSCF 260 sends the SSC client 220 the start accept message at operation 1260.

The SSC client 220 sends the CSCF 260 a reception acknowledgement message at operation 1265. The reception acknowledgement message is represented by the ACK message in the drawing. The CSCF 260 sends the SSC server 230 the ACK message at operation 1275, the SSC server 230 sends the CSCF 260 the ACK message at operation 1280, and the CSCF 260 sends the peer terminal 225 the ACK message at operation 1285.

After transmitting the ACK message to the CSCF 260, the SSC client 220 presents the sponsored service connection success through the Graphic User Interface (GUI) at operation 1270. This is performed independently of the application in order for the user to use the sponsored service securely.

After checking the ACK message, the peer terminal 225 establishes a sponsored service session between the application 210 and the ISP server 270 at operation 1290.

Finally, a description is made of the sponsored intelligent processing and content transmission sponsored service procedure.

Figure 13:
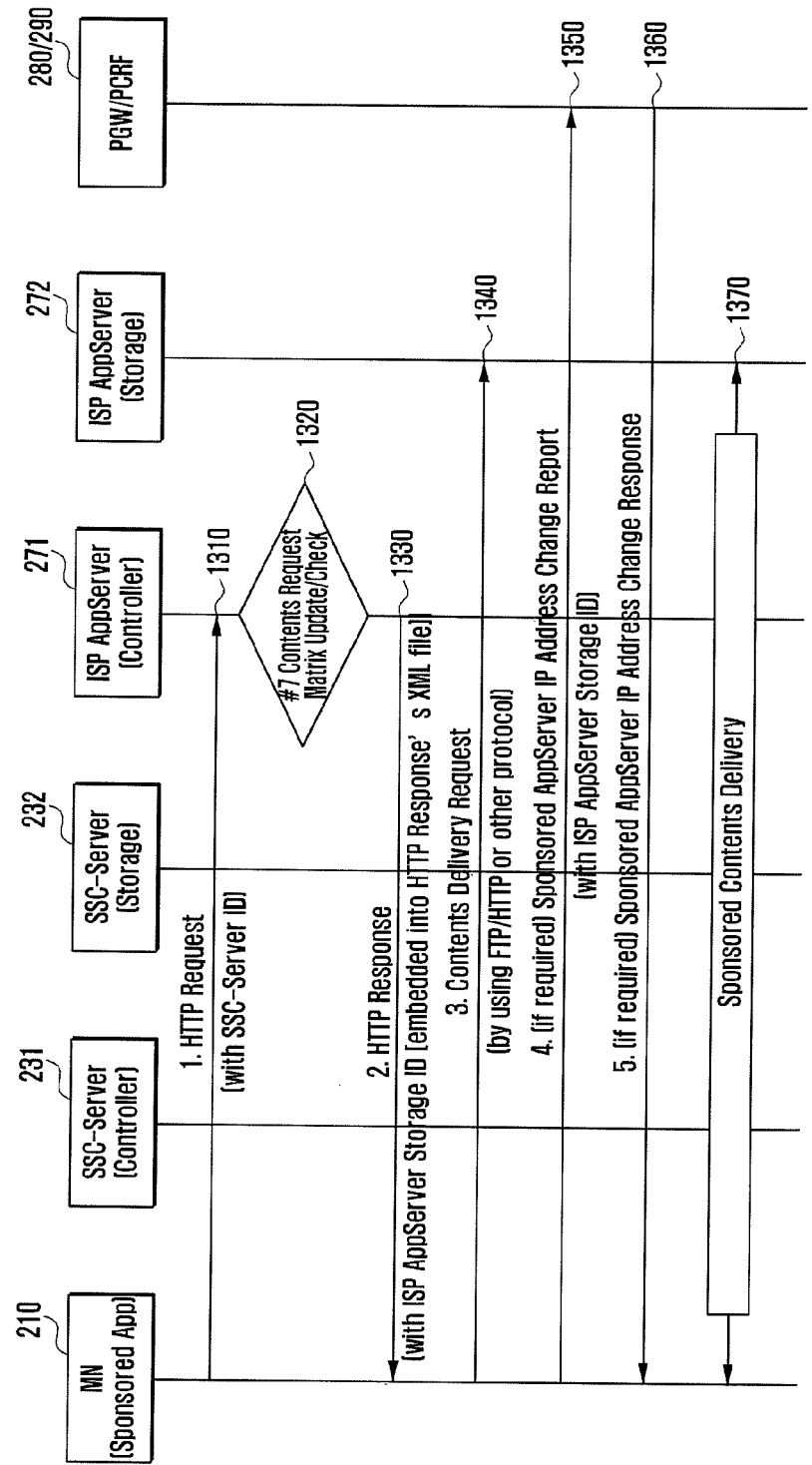
FIG. 13 is a signal flow diagram illustrating a sponsored content transmission service procedure according to an embodiment of the present disclosure.

FIG. 13 is a signal flow diagram illustrating a sponsored content transmission service procedure according to an embodiment of the present disclosure.

The normal procedure for a mobile subscriber to request an ISP for content is comprised of operations 1310, 1330, and 1340. That is, if the mobile terminal connects the ISP server through a transmission protocol such as Hyper Text Transport Protocol (HTTP) at operation 1310, the ISP server sends a response and, if necessary, notifies of the name and location of the storage server storing the corresponding content in the response at operation 1330.

Afterward, the mobile terminal connects to the storage server storing the corresponding content to read the content file at the corresponding location at operation 1340. At this time, the mobile terminal performs the procedure of FIG. 5 before transmitting HTTP message to receive the content from the storage server in the sponsored service. The sponsored intelligent processing and content transmission service is implemented by adding intelligent service to the content transmission in the sponsored service.

That is, a procedure of updating or checking the content request matrix at operation 1320 and exchanging a sponsored application server IP address change report and a sponsored application service IP address change response at operations 1350 and 1360. Afterward, the sponsored content delivery is performed at operation 1370.

Figure 14:
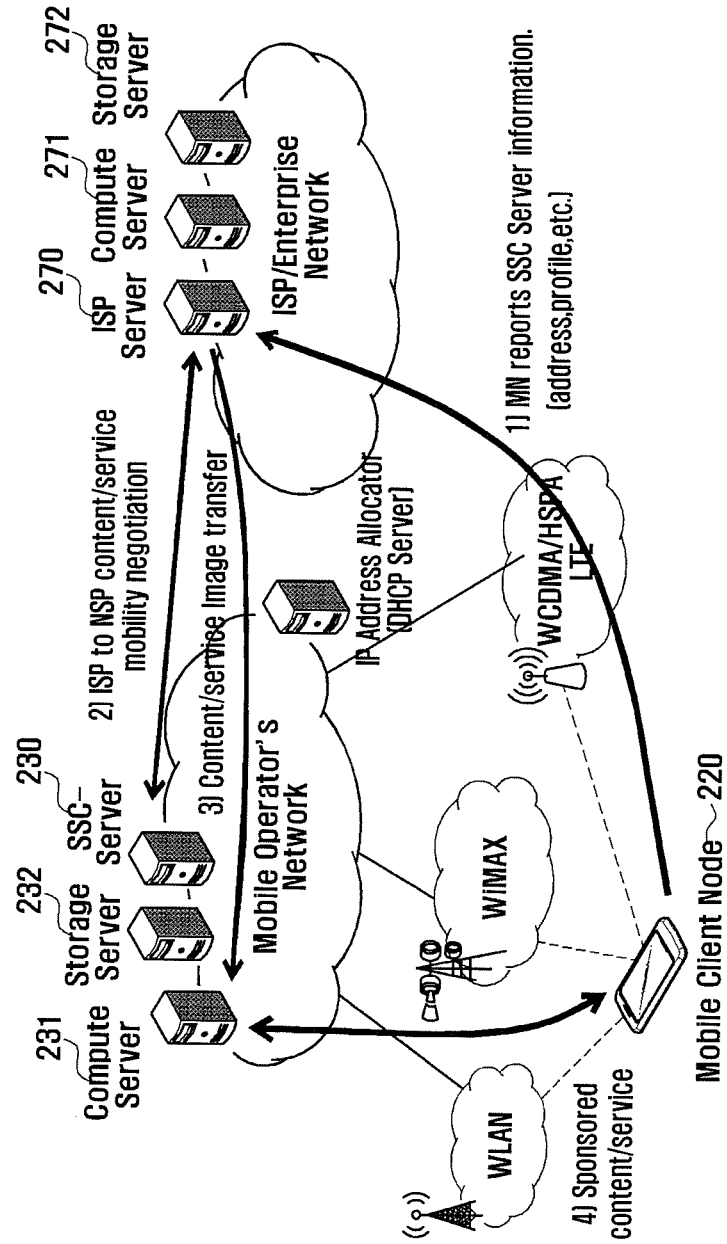
FIG. 14 is a diagram illustrating the concept of sponsored intelligent processing and content transmission service procedure according to an embodiment of the present disclosure.

A concept of the sponsored intelligent processing and content transmission service procedure according to an embodiment of the present disclosure is depicted in FIG. 14. In FIG. 14, the mobile terminal transmits the information on the SSC server 230 when connecting to the service server of the ISP at operation 1). This is embodied in sequence 1 of FIG. 13 for use of notifying the ISP server of the SSC server 230 responsible for the access point of the mobile terminal. If the content requests occur excessively more than a predetermined threshold in a specific area in the state that the ISP server is providing the service with its processor and storage device as shown in FIG. 13, it requests the SSC server 230 responsible for the corresponding area to transmit the content on behalf of the ISP server as operation 2). That is, when the traffic overload is detected at the ISP server, the ISP server requests the nearest SSC server to transmit the content to the mobile terminals on behalf of the ISP server other than the transmitting the content to the mobile terminals through the mobile communication network.

A procedure of transferring the contents to the content storage server controlled by the SSC server 230 of the mobile communication network after the agreement between the SSC server 230 and the ISP server is depicted as denoted by reference number 2). Afterward, if a request for the corresponding content is received from the area controlled by the SSC server 230, the corresponding content is transmitted by the servers under the control for the SSC server 230 in the ISP server's stead. Accordingly, the traffic delay caused by traversing the mobile communication network decreases. Furthermore, the acknowledgement is transmitted to the mobile terminal within the mobile communication network close to the radio network, the service quality is improved.

Operations 2) and 3) of FIG. 14 are described in more detail with reference to FIG. 15.

If requests for specific content occur excessively at a specific area, the ISP server (controller) 271 using HTTP protocol monitors the traffic at a predetermined time interval and sends a sponsored content transfer request message to the SSC server 231 at operation 1510. At this time, the ISP server 271 transmits its ISP ID and the information on the property of the content to be transferred in its stead to the SSC controller 231. If it is determined that the SSC server (controller) 231 can provide the content in the ISP server's stead based on the corresponding information, the SSC server 231 sends the ISP server (controller) 271 a sponsored contents transfer response at operation 1520. Upon receipt of this message, the ISP server (controller) 271 requests its storage server 232 to transfer the corresponding content to the storage server 232 under the control of the SSC server (controller) 230 at operation 1530. The content is transmitted at operation 1540. The SSC server (controller) 231 checks the content at operation 1550 and stores the content in the SSC server (storage) 232 at operation 1560. Once the content transmission completes between the storage servers, the SSC server 230 generates an access URI for the corresponding content and sends an acknowledgement message including the UIR to the ISP server (controller) 271.

In the above procedure, the content is stored in the storage server 232 under the control of the SSC server 230 of the mobile communication network other than the ISP server, the corresponding storage server 232 generates the URI indicating the new location of the corresponding file in the corresponding storage server 232 and sends the UIR to the ISP server (controller) 271.

At this time, the SSC server 230 sends the information on the corresponding content to the gateway such that the gateway, i.e. PGW 280/PCRF 290, to provide the corresponding content in distinguished service quality and collect the statistical information at operation 1580 in order to guarantee the quality of the services using its storage server 232 as the content storage and acquire the statistical information for charging for the use the sponsored service.

Figure 15:
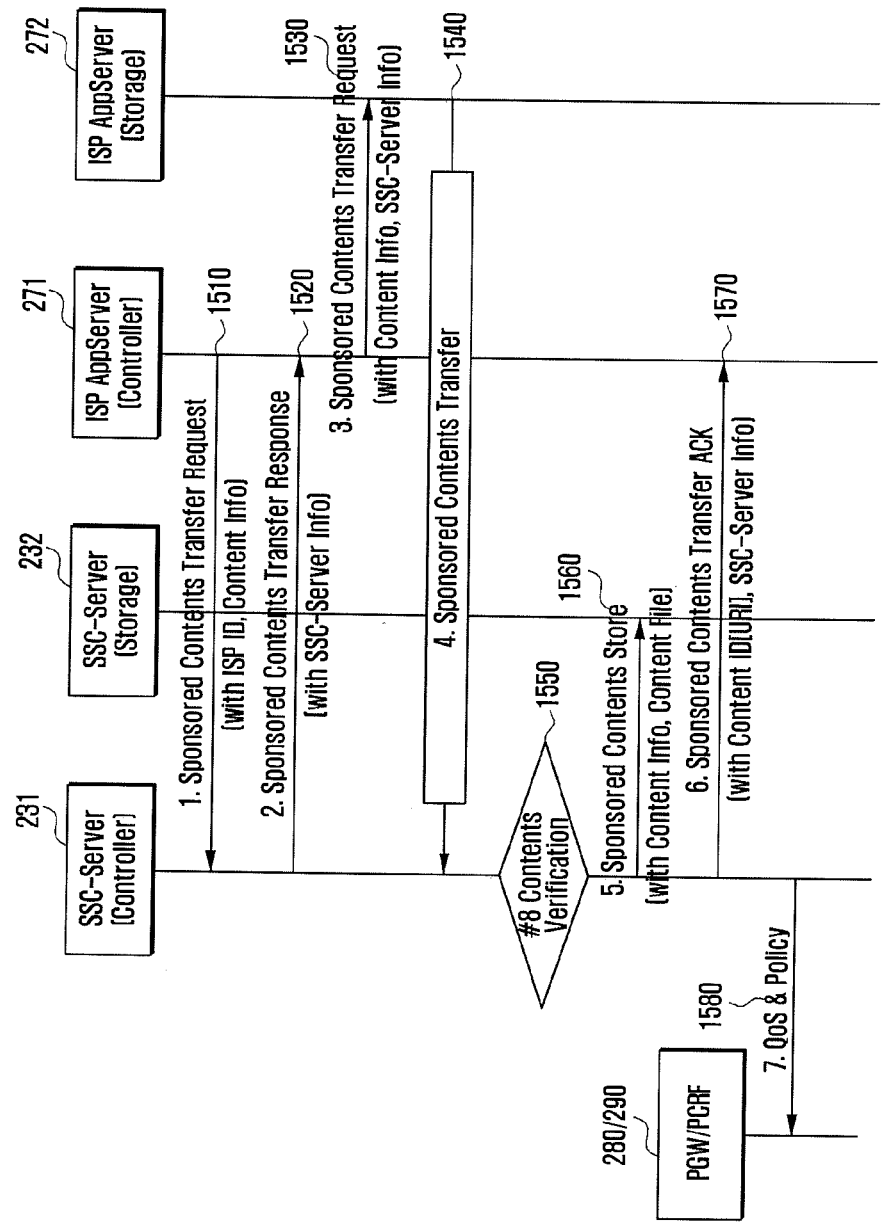
FIG. 15 is a signal flow diagram illustrating a procedure of transferring content to the mobile communication network according to an embodiment of the present disclosure.

If an additional QoS guarantee for the transmission of the corresponding content is requested at the sequence 1 of FIG. 15, the SSC server 231 sends the corresponding PGW 280/PCRF 290 the configuration thereon at operation 1580.

Figure 16:
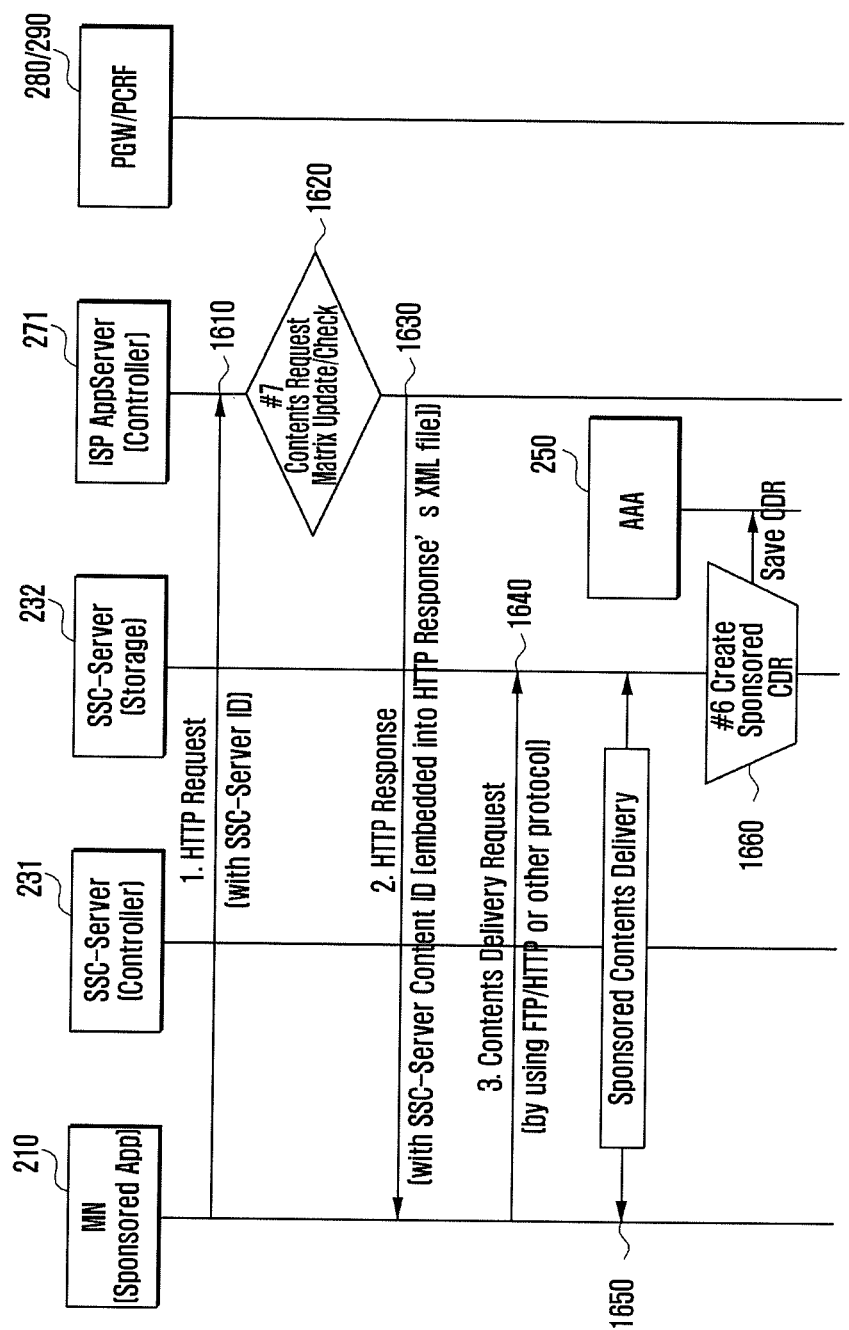
FIG. 16 is a signal flow diagram illustrating an internet service procedure using the contents within the mobile communication network according to an embodiment of the present disclosure.

FIG. 16 is a signal flow diagram illustrating an internet service procedure using the contents within the mobile communication network according to an embodiment of the present disclosure.

As shown in FIG. 16, if the mobile terminal 210 requests the ISP server (controller) 271 for the transferred content at operation 1610, the ISP server (controller) 271 updates the content request matrix at operation 1620 and sends a response message including the URI of the storage server under the control of the SSC server 230 at operation 1630, the URI indicating the location of the content. As a consequence, the mobile terminal 210 accesses the content promptly in the storage server 232 of the SSC server 230 at operation 1640 and receives the content at operation 1650. For the accessed contents, the storage server 232 under the control of the SSC server 230 generates the billing information per content at operation 1660 and sends the billing information to the AAA server for use in changing the ISP for the service.

The ISP server (controller) 271 may checks how many requests for the corresponding contents arrive as a gateway for the content transfer request from the mobile terminal 210. If the number of requests for the content transferred to the storage server under the control of the SSC server 230 decrease during a predetermined time, the ISP deletes the contents transferred to the corresponding mobile communication network and starts transmitting the content to the mobile terminal for itself again.

Figure 17:
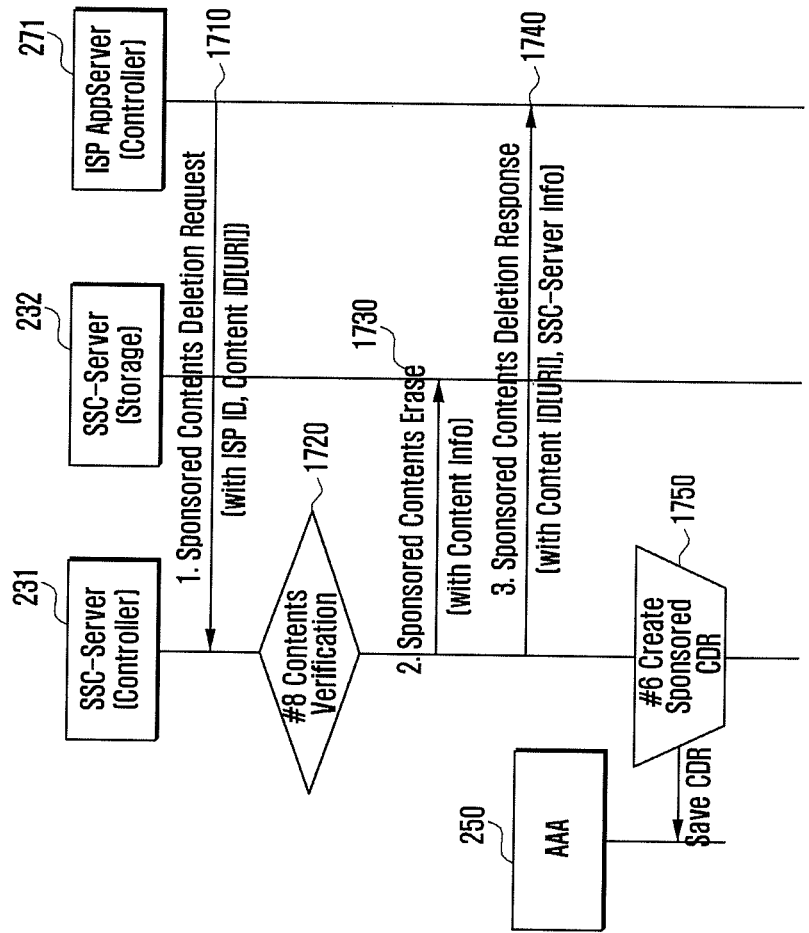
FIG. 17 is a signal flow diagram illustrating a content deletion procedure in the mobile communication network according to an embodiment of the present disclosure.

FIG. 17 is a signal flow diagram illustrating a content deletion procedure in the mobile communication network according to an embodiment of the present disclosure.

The ISP server (controller) 271 sends the SSC server (controller) 231 its ISP ID and the URI of the content which the SSC server (controller) 231 has notified in transferring the corresponding content to request for stopping transmission of the corresponding content at operation 1710. Upon receipt of the request, the SSC server (controller) 231 checks the content at operation 1720, deletes the corresponding content from the storage server 232 under its control at operation 1730, and sends the ISP server (controller) 271 a sponsored content deletion response at operation 1740. Afterward, the SSC server (controller) 231 sends the billing server the information on the sponsored content consumed until then at operation 1750.

Through the procedure of FIG. 17, it is possible to provide the effect of a kind of Content Delivery Network (CDN).

Additionally, it the ISP wants to borrow even the service controller function such as ISP server (controller) 271 temporarily from the mobile communication network operator, it is enough for the ISP server (controller) 271 to receive the messages such as HTTP request from the mobile terminal and forwards the message immediately to the server (controller) under the control of the SSC server 230 on the processor borrowed from the mobile communication network.

The above processes are depicted in more detail in FIGS. 18 to 21. These processes correspond to FIGS. 15 to 17.

Figure 18:
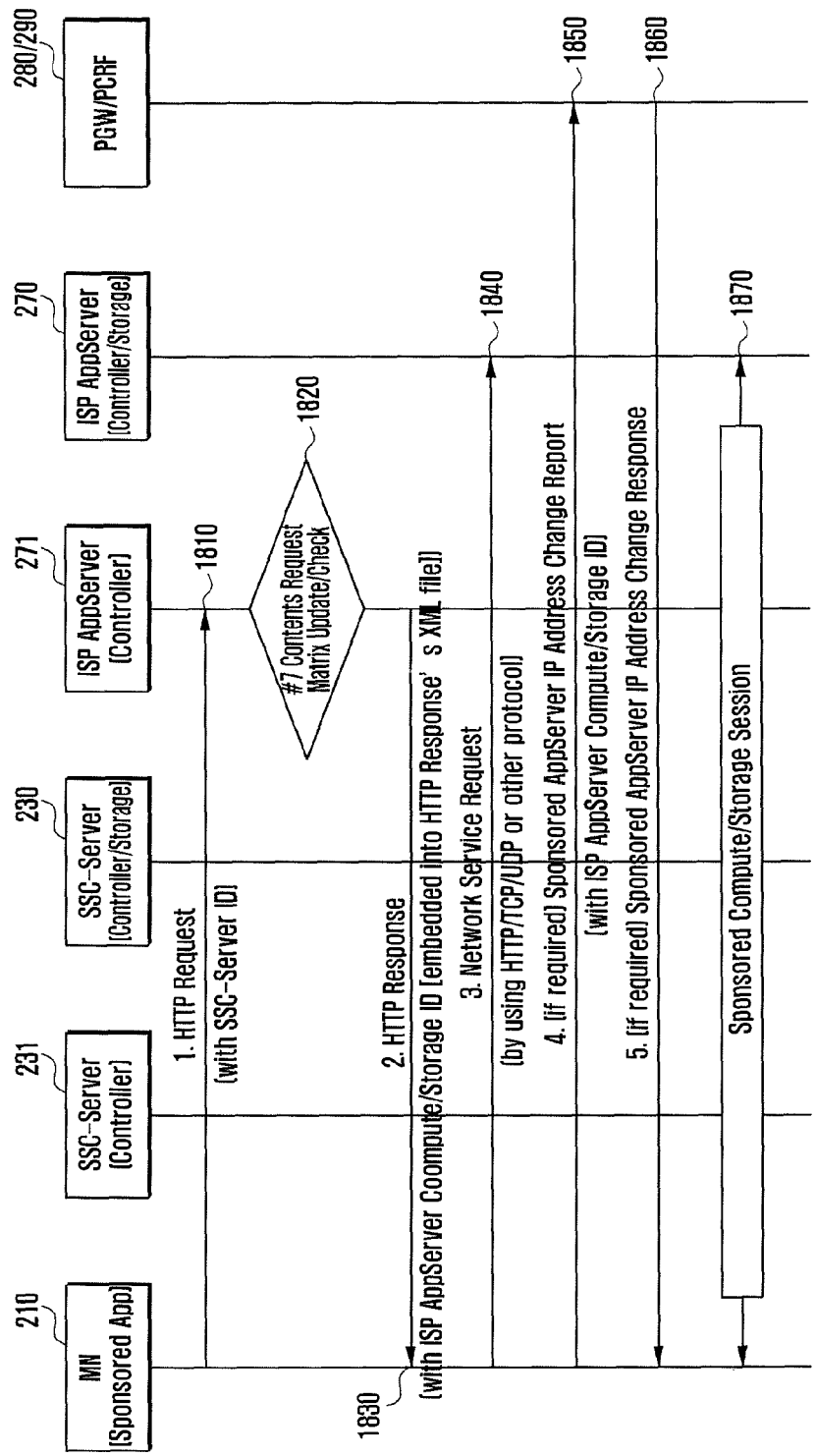
FIG. 18 is a signal flow diagram illustrating a processing and sponsored content service procedure according to an embodiment of the present disclosure.

FIG. 18 is a signal flow diagram illustrating a processing and sponsored content service procedure according to an embodiment of the present disclosure.

If the mobile terminal 210 request the ISP server (controller) 271 for the transmission of the transferred content, the ISP server (controller) 271 updates or checks the content request matrix at operation 1820, and transmits a response including the ID of the ISP server 270 having the content at operation 1830. The mobile terminal 210 requests the changed ISP server 270 for the network service at operation 1840 and, if necessary, sends the PGW 280/PCRF 290 a sponsor ISP server 270' IP address change report at operation at operation 1850. Afterward, the PGW 280/PCRF 290 sends the mobile terminal 210 a sponsor ISP server 270' IP address change response at operation 1860. Afterward, a compute/storage session is established between the mobile terminal 210 and the sponsor ISP server 270'.

Figure 19:
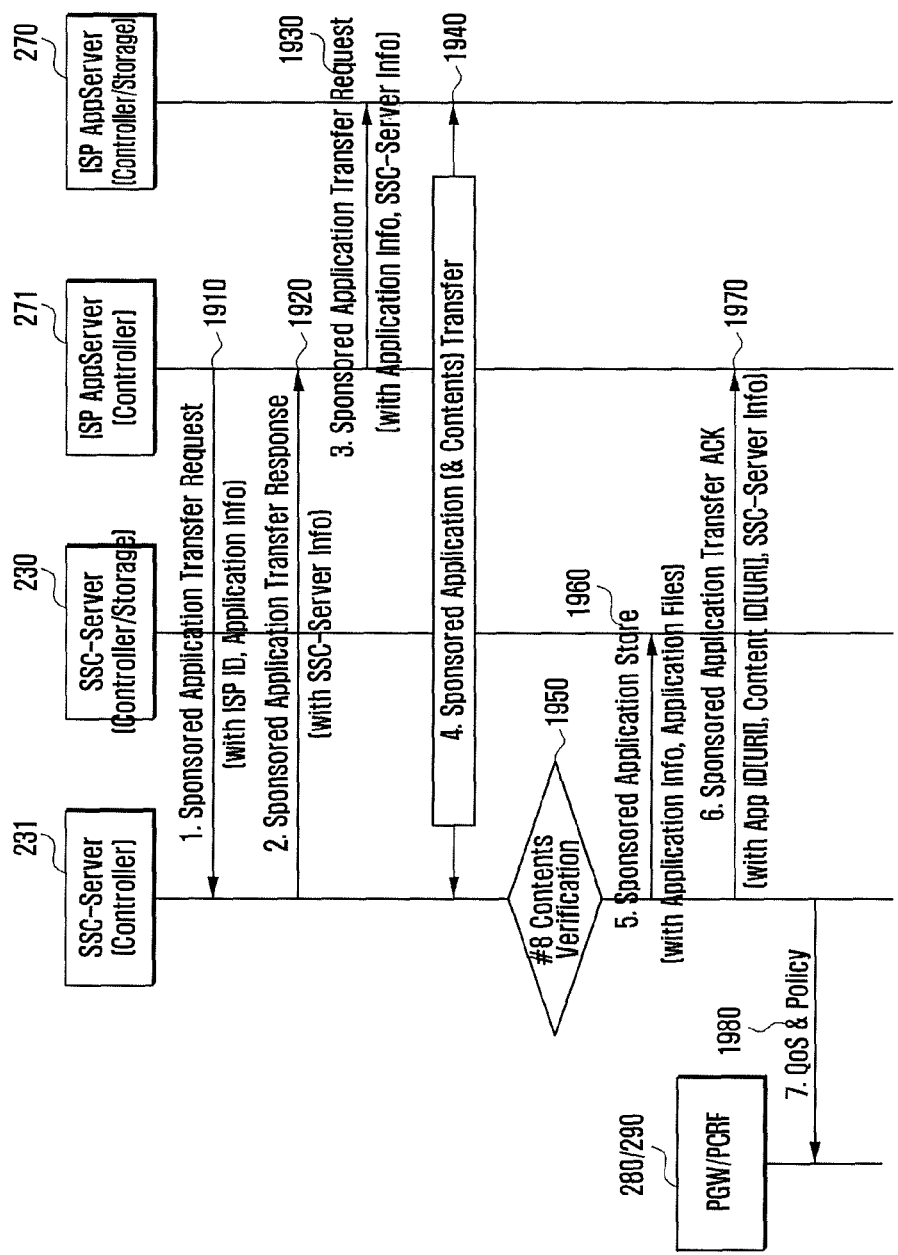
FIG. 19 is a signal flow diagram illustrating a procedure of transferring processing part/content from the mobile communication network.

FIG. 19 is a signal flow diagram illustrating a procedure of transferring processing part/content from the mobile communication network.

If requests for specific content are concentrated from a certain area, the ISP server (controller) 271 using HTTP protocol monitors the traffic at a predetermined time interval and sends a sponsored content transfer request message to the SSC server 231 at operation 1910. If it is determined that the SSC server (controller) 231 can provide the content in the ISP server's stead based on the corresponding information, the SSC server 231 sends the ISP server (controller) 271 a sponsored contents transfer response at operation 1920. Upon receipt of this message, the ISP server (controller) 271 requests the ISP server (storage) 270 to transfer the corresponding content at operation 1930. Afterward, the content is transferred at operation 1940. The SSC server (controller) 231 checks the content at operation 1950 and store the received application and content in the SSC server 230 at operation 1960. If the content transfer has completed, the SSC server (controller) 231 generates a URI for access to the corresponding content and sends the ISP server (controller) 271 an acknowledgement message including the URI at operation 1970.

Additionally, the SSC server 230 collects the statistical information and sends the information on the corresponding content to the gateway such as PGW 280/PCRF 290 at operation 1980 for the purpose of guaranteeing the qualities of the services provided by means of the storage server 232 and issuing for the sponsored service.

If the corresponding content is requested with additional QoS guarantee at the sequence 1 of FIG. 15, the corresponding configuration is also transmitted to the PGW 280/PCRF 290 at operation 1580.

Figure 20:
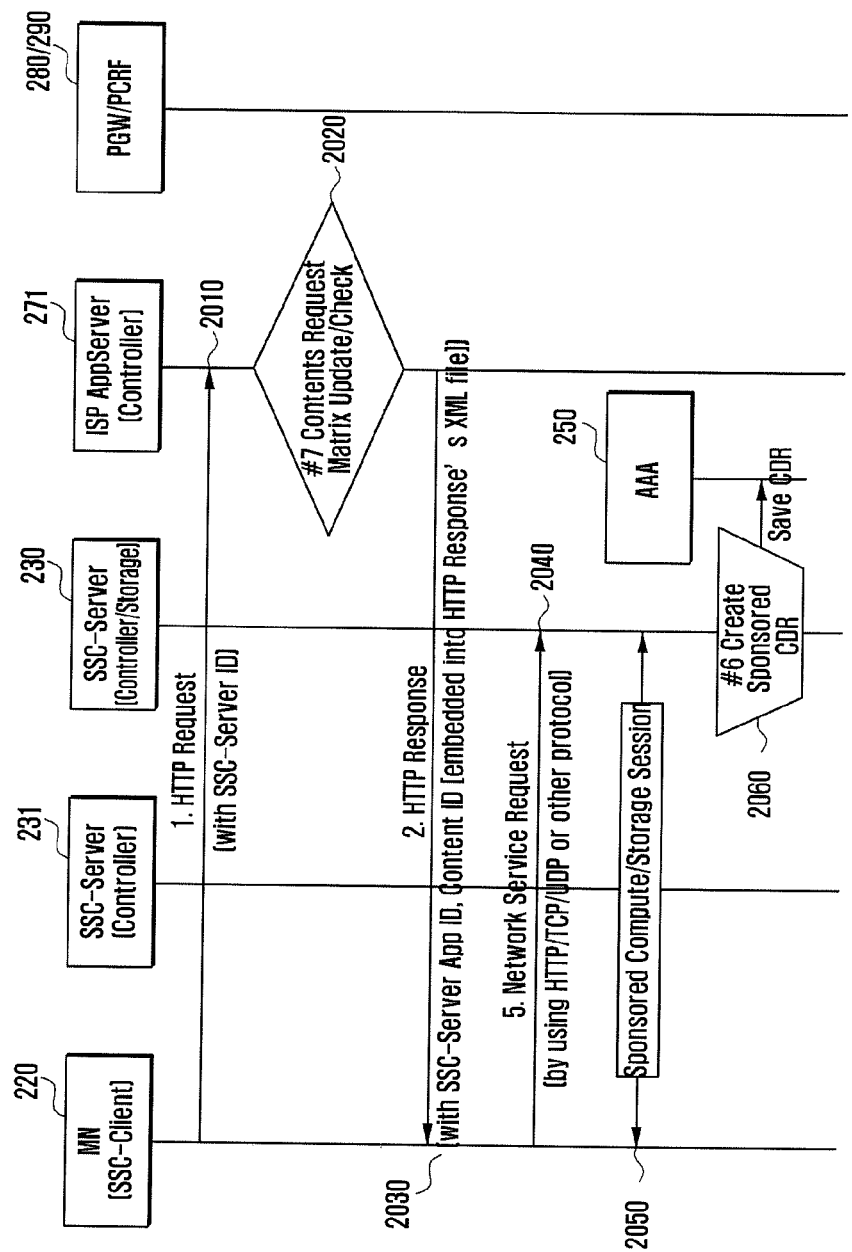
FIG. 20 is a signal flow diagram illustrating an Internet service procedure using the processing unit/content of the mobile communication network.

FIG. 20 is a signal flow diagram illustrating an Internet service procedure using the processing unit/content of the mobile communication network.

If the mobile terminal 210 requests the ISP server (controller) 271 for the transferred content at operation 2010, the ISP server (controller) 271 updates or checks the content request matrix at operation 2020 and sends a response including the URI of the storage server under the control of the SSC server 230 at operation 2030, the URI indicating the location of the content. Then the mobile terminal 210 request the corresponding SSC server 230 for the network service at operation 2040 and establishes a sponsored processing and content session at operation 2050. Afterward, the SSC server 230 generates the billing information per case and sends the information to the AAA server 250 for use in charging the ISP for the service at operation 2060.

Figure 21:
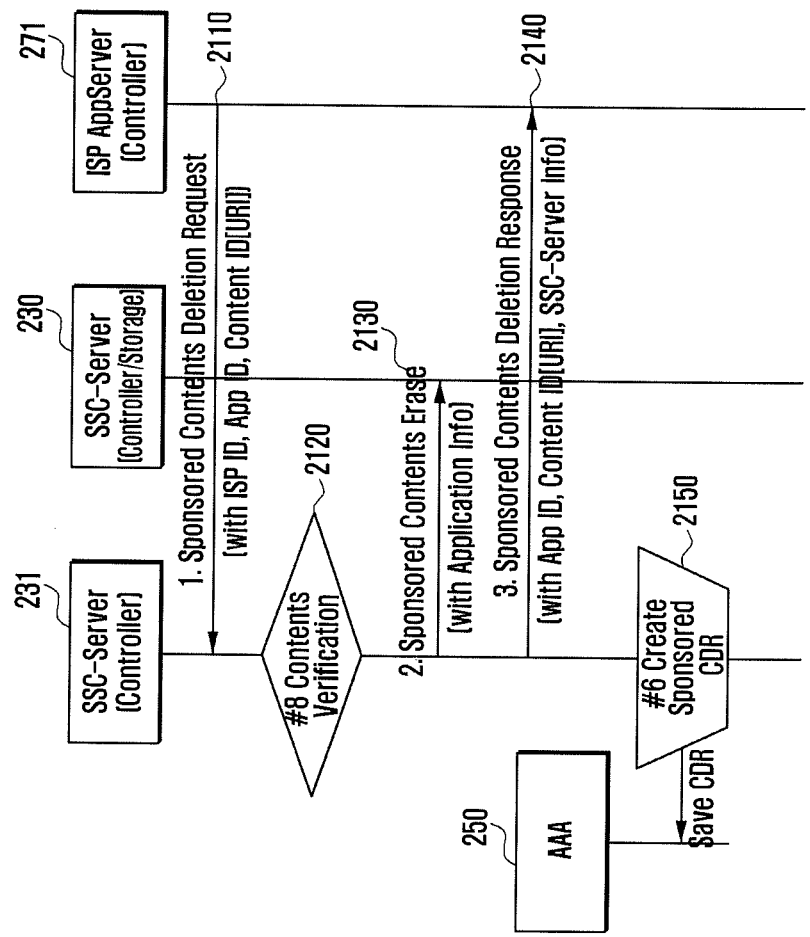
FIG. 21 is a signal flow diagram illustrating a mobile communication network's processing unit/content deletion procedure.

FIG. 21 is a signal flow diagram illustrating a mobile communication network's processing unit/content deletion procedure.

The ISP server (controller) 271 request the SSC server (controller) 231 to stop transmitting the application and content in its stead by sending its ISP ID and the URI of the application and content which has been provided by the SSC server (controller) 231. Upon receipt of the corresponding information, the SSC server (controller) 231 checks the content at operation 2120, deletes the corresponding application and content in the storage server 232 under its control, and sends the ISP server (controller) 271 the content deletion response at operation 2410. Afterward, it sends the information on the contents transmitted in the sponsored service to the billing server at operation 2150.

Figure 22:
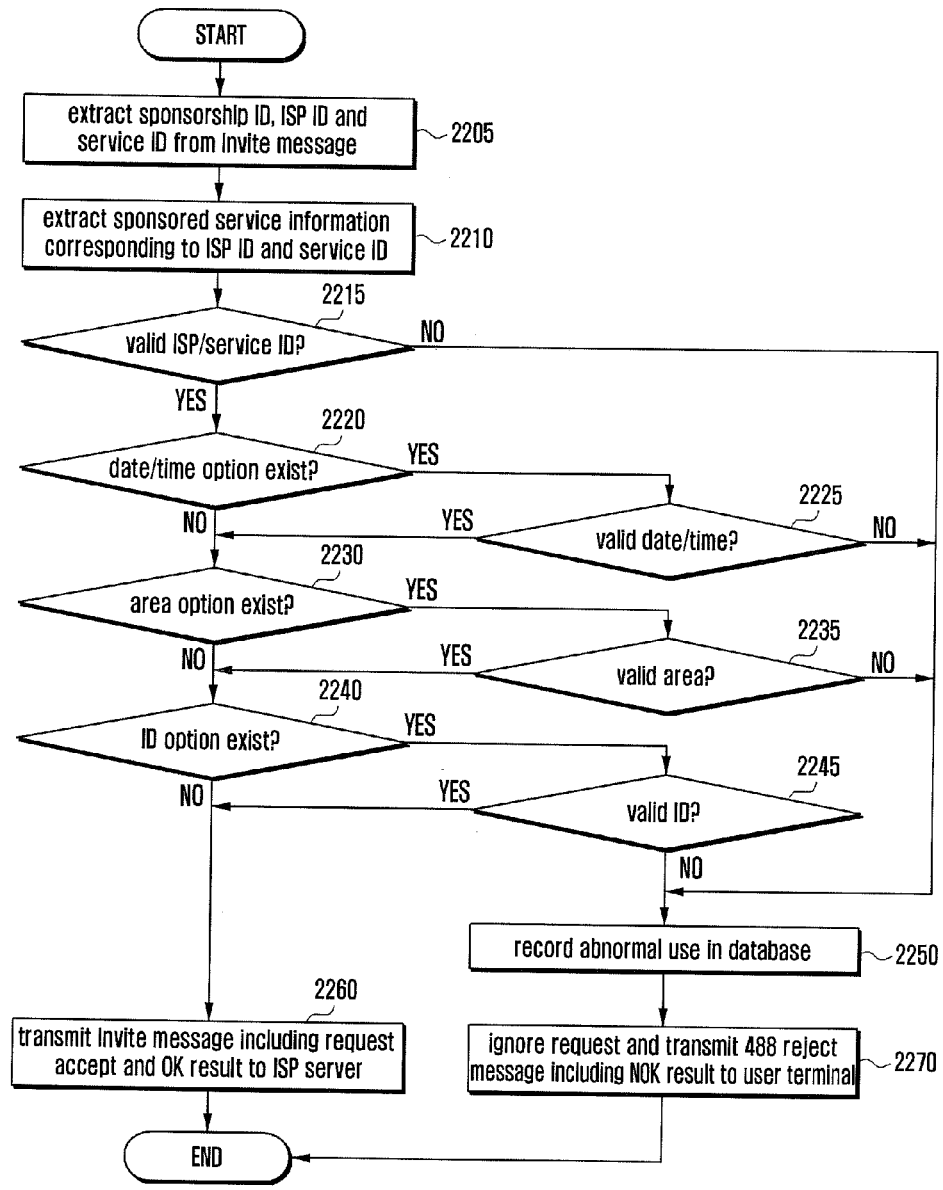
FIG. 22 is a flowchart illustrating a sponsored application service authentication procedure of the SSC server.

FIG. 22 is a flowchart illustrating a sponsored application service authentication procedure of the SSC server.

The SSC server 230 extracts sponsorship ID, ISP ID, and service ID from the received Invited message at operation 2205 and extracts the sponsored service information corresponding to the ISP ID and service ID at operation 2210.

Next, the SSC server 230 determines whether the ISP ID or the Service ID is valid at operation 2215. If the ISP ID or the service ID is valid, the SSC server determines whether date/time option exists at operation 2220. If there is no date/time option, the SSC server 230 determines whether area option exists at operation 2230. If there is not area option, the SSC server 230 determines whether ID option exists at operation 2240. If there is no ID option, the SSC server 230 accepts the request and sends the ISP server 270 the Invite message with OK result at operation 2260.

If it is determined that the ISP ID or service ID is invalid at operation 2215, the SSC server 230 records abnormal use in the database at operation 2250. The SSC server 230 ignores the request and sends the user terminal the 488 reject message along with NOK result at operation 2270.

If it is determined that the date/time option exists at operation 2220, the SSC server 230 determines whether the date/time is valid at operation 2225 and, if the date/time is valid, the procedure goes to operation 2230. If it is determined that the date/time is invalid, the procedure goes to operation 2250.

If it is determined that the area option exists at operation 2230, the SSC server 230 determines whether the area is valid at operation 2235 and, if the area is valid, the procedure goes to operation 2240. If it is determined that the area is invalid, the procedure goes to operation 2250.

If it is determined that the ID option exists at operation 2240, the SSC server determines whether the ID is valid at operation 2245 and, if the ID is valid, the procedure goes to operation 2260. Otherwise if the ID is invalid, the procedure goes to operation 2250.

Figure 23:
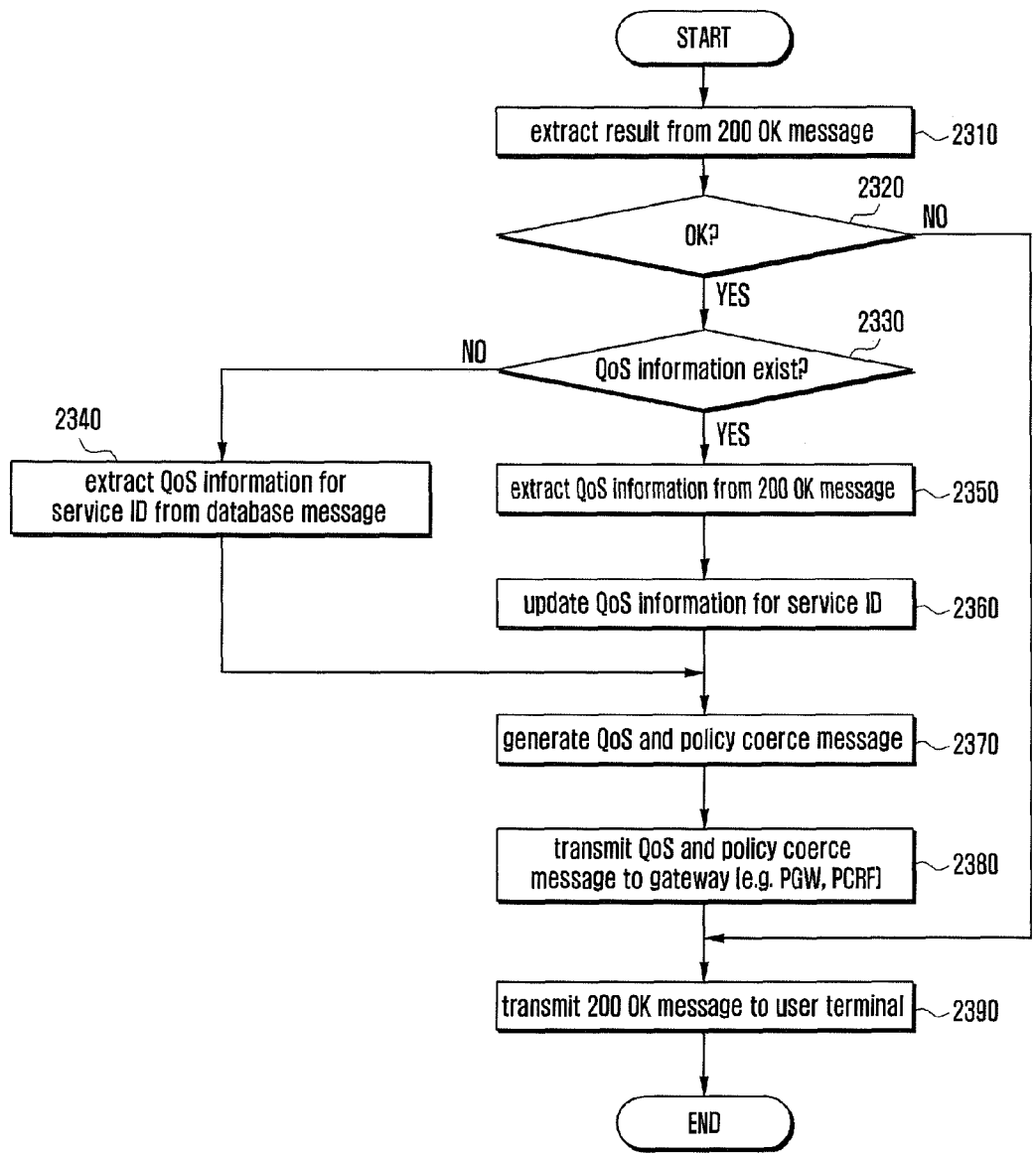
FIG. 23 is a flowchart illustrating a QoS/statistical information configuration procedure for the sponsored application service of the SSC server.

FIG. 23 is a flowchart illustrating a QoS/statistical information configuration procedure for the sponsored application service of the SSC server.

The SSC server 230 extracts the result from the 200 OK message at operation 2310. Afterward, the SSC server 230 determines whether the result is OK at operation 2320. If the result is OK, the SSC server 230 determines whether QoS information exists at operation 2330. If the QoS information exists, the SSC server 230 extracts the QoS information from the OK message at operation 2350. Next, the SSC server 230 updates the QoS information for the service ID at operation 2360.

Next, the SSC server 230 generates a QoS and policy coercion message at operation 2370 and sends the QoS and police coercion message to the gateway at operation 2380. Next, the SSC server 230 sends the user terminal the 200 OK message at operation 2390.

If the SSC server 230 fails extracting the result at operation 2320, the procedure goes to operation 2390.

If it is determined that the QoS information does not exist at operation 2330, the SSC server 20 extracts the QoS information for the service ID from a database message at operation 2340 and then the procedure goes to operation 2370.

Figure 24:
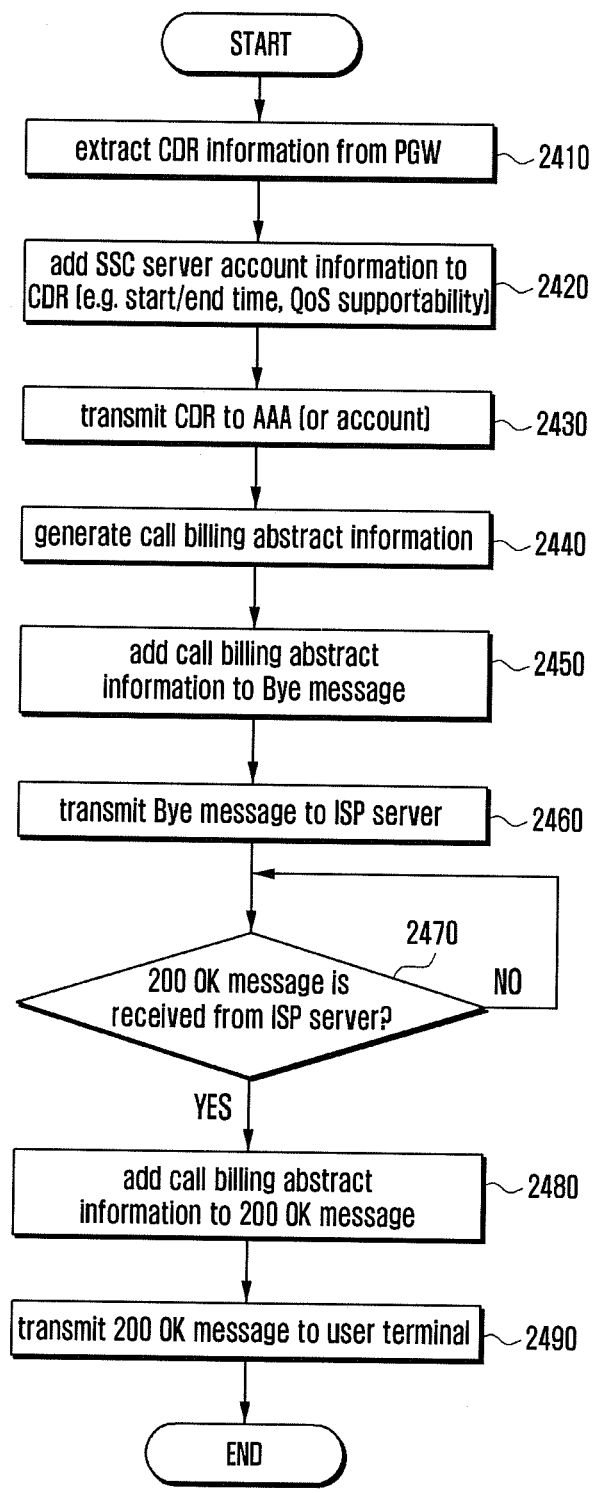
FIG. 24 is a flowchart illustrating a billing information generation and transfer procedure of the SSC server.

FIG. 24 is a flowchart illustrating a billing information generation and transfer procedure of the SSC server.

The SSC server 230 receives CDR information from the PGW at operation 2410. Next, the SSC server 230 adds the account information to the CDR at operation 2420 and sends the CDR to the AAA server at operation 2430. Next, the SSC server 230 generates a call billing abstract information at operation 2440, adds the call billing abstract information to the By message at operation 2450, and sends the By message to the ISP server at operation 2460.

The SSC server 230 determines whether a 200 OK message is received from the ISP server at operation 2470. If the 200 OK message is received, the SSC server 230 adds the call billing abstract information to the 200 OK message at operation 2480 and sends the 200 OK message to the user terminal 2490.

If it is determined that no 200 OK message is received at operation 2740, the SSC server 230 repeats operation 2470.

Figure 25:
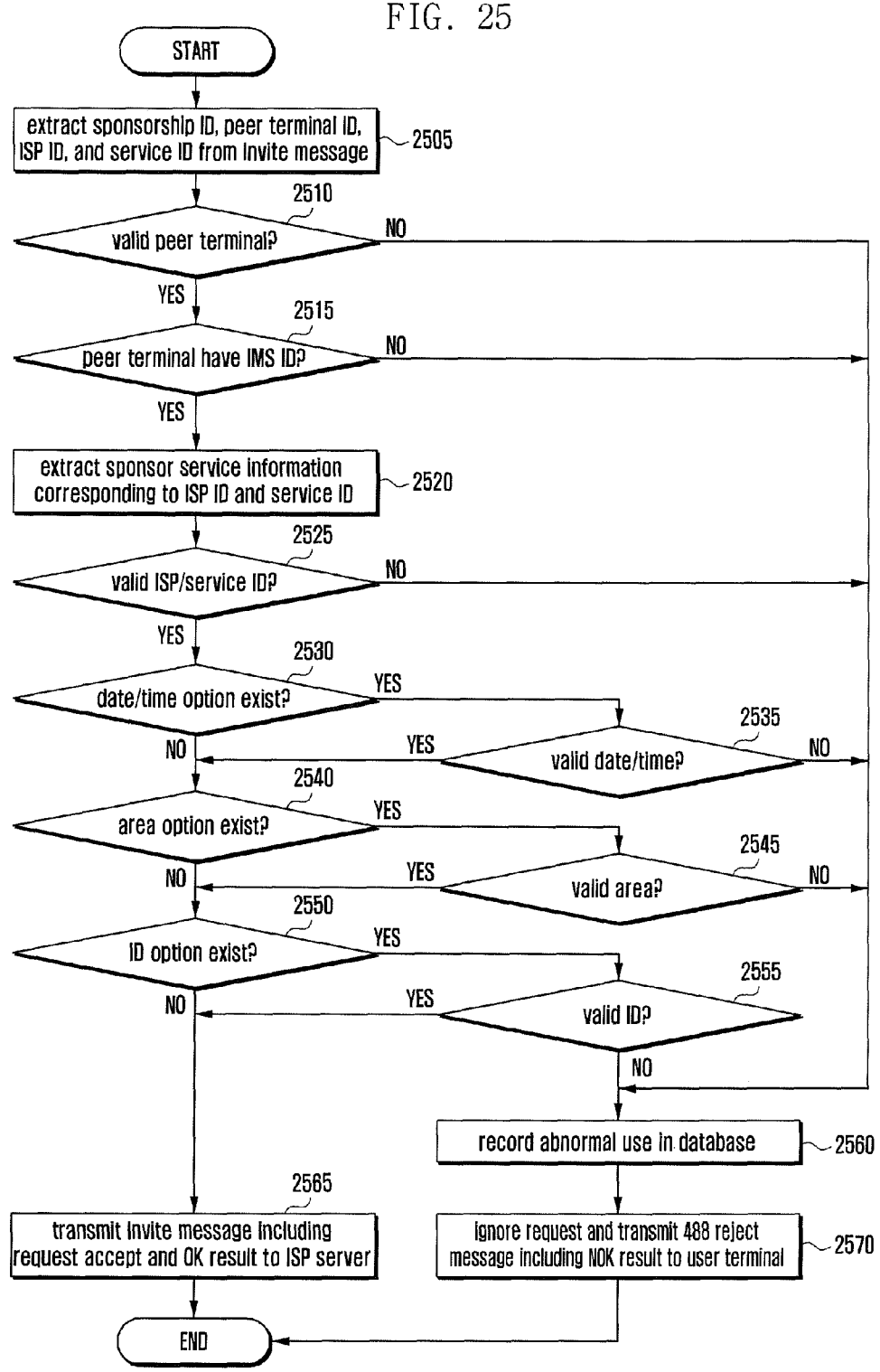
FIG. 25 is a flowchart illustrating a sponsored communication service authentication procedure of the SSC server.

FIG. 25 is a flowchart illustrating a sponsored communication service authentication procedure of the SSC server.

The SSC server 230 extracts sponsorship ID, ISP ID, and service ID from the received Invite message at operation 2505 and extracts the ISP ID and service ID at operation 2210.

Next, the SSC server 230 determines whether the peer terminal is valid at operation 2510. If the peer terminal is valid, the SSC server determines whether the peer terminal has an IMS ID at operation 2515. If the peer terminal has the IMS ID, the SSC server 230 extracts the sponsored service information corresponding to the ISP ID and service ID at operation 2520.

Next, the SSC server determines whether the ISP ID or service ID is valid at operation 2525. If the ISP ID or service ID is valid, the SSC server 230 determines whether date/time option exists at operation 2530. If no date/time option exists, the SSC server 230 determines whether area option exists at operation 2540. If no area option exists, the SSC server determines whether ID option exists at operation 2550. If no ID option exists, the SSC server 230 accepts the request and sends the ISP server 270 the Invite message including OK result at operation 2565.

If it is determined that the ISP ID or service ID is invalid at operation 2525, the SSC server 230 records abnormal use in the database at operation 2560. Next, the SSC server 230 ignores the request and sends the user terminal the 488 reject message including NOK result at operation 2570.

If it is determined that the date/time option exists at operation 2530, the SSC server 230 determines whether the date/time is valid at operation 2535 and, if the date/time is valid, the procedure goes to operation 2540. Otherwise if the date/time is invalid, the procedure goes to operation 2560.

If it is determined that the area option exists at operation 2540, the SSC server 230 determines whether the area is valid at operation 2545, and if the area is valid, the procedure goes to operation 2550. Otherwise if the area is invalid, the procedure goes to operation 2560.

If it is determined that the ID option exists at operation 2550, the SSC server 230 determines whether the ID is valid at operation 2555, and if the ID is valid, the procedure goes to operation 2265. Otherwise if the ID is invalid, the procedure goes to operation 2560.

Figure 26:
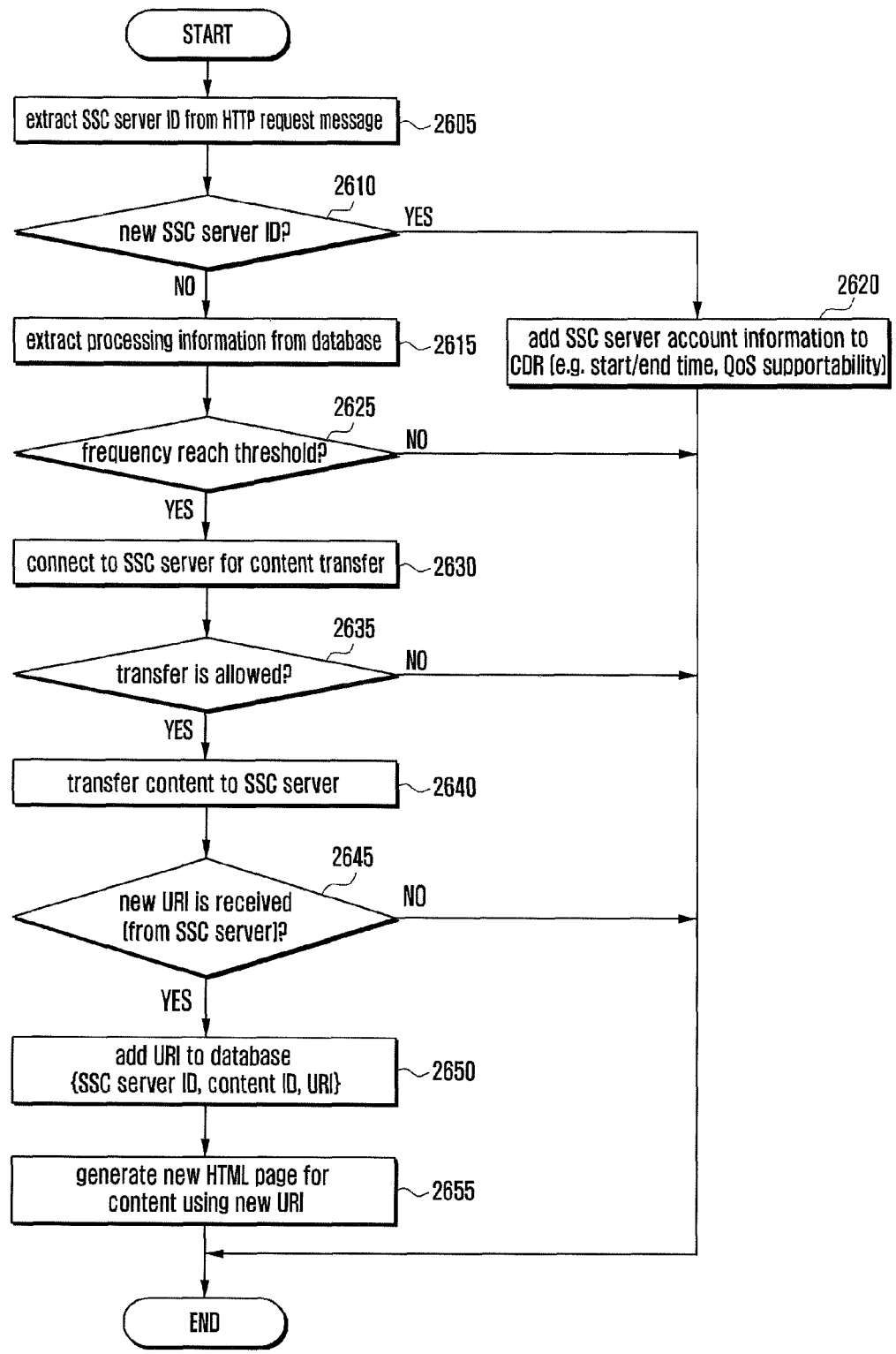
FIG. 26 is a flowchart illustrating a sponsored intelligent processing and content transmission service procedure of the ISP server.

FIG. 26 is a flowchart illustrating a sponsored intelligent processing and content transmission service procedure of the ISP server.

The ISP server (controller) 271 extracts SSC server ID form the HTTP request message at operation 2605. Next, the ISP server (controller) 271 determines whether the SSC server ID is a new SSC server ID at operation 2610. If the SSC server ID is not a new SSC server ID, the ISP server (controller) 271 extracts processing information from the database at operation 2615. Next, the ISP server (controller) 271 determines whether the request frequency has reached a predetermined threshold at operation 2625. The frequency has reached the threshold, the ISP server (controller) 271 connects to the SSC server to transfer the content at operation 2630.

Next, the ISP server (controller) 271 determines whether the transfer is accepted at operation 2635. If the transfer is accepted, the ISP server 271 transfers the content to the SSC server at operation 2640.

Afterward, the ISP server (controller) 271 determines whether a new URI is received at operation 2645. If a new URI is received, the ISP controller 271 adds the URI to the database at operation 2650 and generates a new HTML page for the content using the new URI at operation 2655.

If it is determined that the SSC server ID is a new SSC server ID at operation 2610, the ISP server (controller) 271 adds the SSC server account information to the CDR at operation 2620 and ends the procedure.

If it is determined that the frequency has not reached the threshold at operation 2625, the ISP server (controller) 271 ends the procedure immediately.

If it is determined that the transfer is not accepted, the ISP server (controller) 271 ends the procedure immediately.

If it is determined that a new URI is not received, the ISP server (controller) 271 ends the procedure immediately.

Although various embodiments of the present disclosure have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope of the disclosure.

The invention claimed is:

1. A method by a server for providing a sponsored service in a mobile communication network, the method comprising:
   receiving a first message for requesting a sponsored service from a terminal;
   determining whether a request for the sponsored service indicated in the first message is valid;
   transmitting a second message for requesting the sponsored service to an internet service provider;
   receiving, in response to the second message, a response message indicating that the sponsored service is valid from the internet service provider;
   transmitting, to the terminal, a third message, based on the response message, for establishing a sponsored service session between the terminal and the internet service provider according to the request for the sponsored service; and
   transmitting, if the sponsored service session is terminated, billing information generated by the server to an authentication/authorization/accounting (AAA) server,
   wherein the billing information associated with a fee of a mobile communication network usage corresponding to the sponsored service is used to charge the internet service provider for the sponsored service.

2. The method of claim 1, wherein the transmitting of the response message comprises:
   wherein the second message is transferred from the internet service provider to a peer terminal, when the sponsored service is valid,
   wherein the response message which is received at the server from the internet service provider is transferred from the peer terminal to the internet service provider, and
   wherein the sponsored service session is established between the terminal and the peer terminal.

3. The method of claim 1,
   wherein the mobile communication network is based on an IMS, and
   wherein the response message includes QoS information inserted by the internet service provider.

4. The method of claim 3, wherein the transmitting the third message to the terminal comprises:
   extracting the QoS information from the response message;
   updating, at an SSC, the QoS information;
   generating a QoS and policy coerce message based on the QoS information;
   transmitting the QoS and policy coerce message to a gateway; and
   transmitting the third message to the terminal.

5. The method of claim 1, wherein the transmitting of the billing information comprises: receiving Call Detail Recording (CDR) information from a gateway; adding SSC server account information to the CDR information to generate the billing information; and transmitting the billing information to the AAA server.

6. The method of claim 5, further comprising transmitting the billing information to the terminal.

7. The method of claim 1, wherein the determining whether the sponsored service is valid comprises checking validity of at least one of ISP ID, service ID, date, time, area, and IP multimedia subsystem (IMS) ID.

8. A server for providing a sponsored service of in a mobile communication network, the server comprising:
 a transceiver configured to receive a first message from a terminal; and
 a controller configured to determine whether a request for the sponsored service indicated in the first message is valid, transmit, by the transceiver to an internet service provider a second message for requesting the sponsored service, receive, in response to the second message, a response message indicating that the sponsored service is valid by the transceiver from the internet service provider, transmit, by the transceiver to the terminal, a third message, based on the response message, for establishing a sponsored service session between the terminal and the internet service provider according to a request for the sponsored service, and transmit, if the sponsored service session is terminated, billing information generated by the sponsored service server to an authentication/authorization/accounting (AAA) server,
 wherein the billing information associated with a fee of a mobile communication network usage corresponding to the sponsored service is used to charge the internet service provider for the sponsored service.

* * * * *